(12) United States Patent
Lee

(10) Patent No.: US 11,448,848 B2
(45) Date of Patent: Sep. 20, 2022

(54) LENS DRIVING DEVICE AND CAMERA MODULE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 199 days.

(21) Appl. No.: 16/763,520

(22) PCT Filed: Dec. 18, 2018

(86) PCT No.: PCT/KR2018/016146
§ 371 (c)(1),
(2) Date: May 12, 2020

(87) PCT Pub. No.: WO2019/124942
PCT Pub. Date: Jun. 27, 2019

(65) Prior Publication Data
US 2020/0326498 A1 Oct. 15, 2020

(30) Foreign Application Priority Data

Dec. 19, 2017 (KR) ........................ 10-2017-0174976
Jan. 9, 2018 (KR) ........................ 10-2018-0002689

(51) Int. Cl.
| *G02B 7/02* | (2021.01) |
| *G02B 7/08* | (2021.01) |
| *G02B 27/64* | (2006.01) |
| *G02B 7/09* | (2021.01) |

(52) U.S. Cl.
CPC ................. *G02B 7/02* (2013.01); *G02B 7/08* (2013.01); *G02B 27/646* (2013.01); *G02B 7/09* (2013.01); *G03B 2205/0069* (2013.01)

(58) Field of Classification Search
None
See application file for complete search history.

(56) References Cited

U.S. PATENT DOCUMENTS

| 2015/0309282 A1 | 10/2015 | Lee et al. |
| 2016/0025951 A1 | 1/2016 | Park et al. |
| 2016/0261778 A1* | 9/2016 | Kim .................. H04N 5/2252 |
| 2019/0107685 A1 | 4/2019 | Kim et al. |

FOREIGN PATENT DOCUMENTS

| CN | 105022203 A | 11/2015 |
| CN | 106054346 A | 10/2016 |
| CN | 105744131 B * | 7/2019 ........... H04N 5/2253 |

(Continued)

*Primary Examiner* — Darryl J Collins
*Assistant Examiner* — Tamara Y. Washington
(74) *Attorney, Agent, or Firm* — Birch, Stewart, Kolasch & Birch, LLP

(57) ABSTRACT

A lens drive device including a bobbin disposed within the housing; a coil disposed in the bobbin; a magnet disposed in the housing and facing the coil; a base disposed below the housing; and an elastic member coupled to the bobbin and the housing is provided. The base includes a groove formed in the upper surface thereof. At least a part of the elastic member is disposed in the groove of the base or above the groove. The groove of the base is disposed with a damping material.

21 Claims, 22 Drawing Sheets

(56) References Cited

FOREIGN PATENT DOCUMENTS

| | | |
|---|---|---|
| EP | 2808717 A2 | 12/2014 |
| EP | 3 404 477 A1 | 11/2018 |
| KR | 10-2014-0119360 A | 10/2014 |
| KR | 10-2015-0128263 A | 11/2015 |
| KR | 10-2016-0012435 A | 2/2016 |
| KR | 10-2016-0057721 A | 5/2016 |
| KR | 10-2017-0029986 A | 3/2017 |
| KR | 10-2017-0111035 A | 10/2017 |
| KR | 10-2017-0126165 A | 11/2017 |

\* cited by examiner

LENS DRIVING DEVICE AND CAMERA MODULE

CROSS REFERENCE TO RELATED APPLICATIONS

This application is the National Phase of PCT International Application No. PCT/KR2018/016146, filed on Dec. 18, 2018, which claims priority under 35 U.S.C. 119(a) to Patent Application No. 10-2017-0174976, filed in the Republic of Korea on Dec. 19, 2017 and Patent Application No. 10-2018-0002689, filed in the Republic of Korea on Jan. 9, 2018, all of which are hereby expressly incorporated by reference into the present application.

TECHNICAL FIELD

The present embodiments relate to a lens driving device and a camera module.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals. A camera module is one of the representative items that capture a subject in a picture or a video. A camera module has recently surfaced that is mounted with a lens driving device performing an AF (Auto Focus) function that automatically adjusts a focus in response to a distance to a subject.

However, a lens driving device suffers from a disadvantage in that an image quality is deteriorated by resonance phenomenon (oscillation phenomenon) of a mover (a bobbin and a lens module are mounted to be moved to an optical axis direction).

Furthermore, there is another disadvantage in that a mover is tilted to allow a part of an elastic member to collide or to be interfered with the mover when the mover moves or receives a shock from outside, whereby the elastic member is easily damaged.

DETAILED DESCRIPTION OF THE INVENTION

Technical Subject

The exemplary and non-limiting embodiments of this invention are to provide a lens driving device configured to restrict resonance (oscillation) phenomenon of a mover (bobbin), a camera module mounted with the lens driving device and an optical instrument mounted with the camera module.

Furthermore, the exemplary and non-limiting embodiments of this invention are to provide a voice coil motor configured to improve the structure of a bobbin in order to prevent the shock of the bobbin comprised in an elastic member and a mover.

Technical Solution

A lens driving device according to an exemplary embodiment of the present invention comprises: a housing; a bobbin disposed within the housing; a coil disposed in the bobbin; a magnet disposed in the housing and facing the coil; a base disposed below the housing; and an elastic member coupled to the bobbin and the housing, wherein the base comprises a groove formed in the upper surface thereof, at least a part of the elastic member is disposed in the groove of the base or above the groove, and the groove of the base is disposed with a damping material.

The housing may comprise a first groove formed at a lower surface and disposed on the groove of base, at least a part of the elastic member may be disposed on at least one of the groove of the base and the first groove of the housing, and the groove of the base and the first groove of the housing may be disposed with a damping material.

The groove of the base and the first groove of housing may be connected to a vertical direction.

A width of the groove at the base may be narrower than a width of the first groove of the housing to allow a part of an upper surface of the base to be overlapped with the first groove of the housing to a vertical direction.

The elastic member may comprise a first elastic member disposed underneath the bobbin and the housing, the first elastic member may comprise a first inner elastic part coupled with the bobbin, a first outer elastic part coupled with the housing, and a first connection elastic part connecting the first inner elastic part and the first outer elastic part, the first inner elastic part may comprise a protrusion protruding toward the first outer elastic part, and at least a part of the protrusion at the first elastic member may be disposed on the groove of the base or on the groove.

The groove of the base may comprise a first groove and a second groove disposed opposite to the first groove, the protrusion of the first elastic member may comprise a first protrusion disposed, for at least a part thereof, on the first groove of the base or the first groove, and a second protrusion disposed at an opposite side of the first protrusion, and disposed, for at least a part thereof, on the second groove of the base or the second groove.

The first protrusion of the first elastic part may comprise a 1-1 protrusion and a 1-2 protrusion each disposed in parallel.

The elastic member may further comprise a second elastic member disposed on the bobbin and the housing, wherein the housing may comprise a second groove formed on an upper surface, the second elastic member may comprise a second inner elastic part coupled with the bobbin, a second outer elastic part coupled with the housing and a second connection elastic part connecting the second inner elastic part and the second outer elastic part, the second inner elastic part may comprise a first protrusion protruding toward the second outer elastic part, at least one of the first protrusion of the second elastic member may be disposed on the second groove of the housing, and the second groove of the housing may be disposed with a damping material.

A camera module according to an exemplary embodiment of the present invention comprises: a housing; a bobbin disposed within the housing; a lens module disposed within the bobbin; a coil disposed on the bobbin; a magnet disposed on the housing and facing the coil; a base disposed underneath the housing; an elastic member coupled with the bobbin and the housing; a substrate disposed underneath the base; and an image sensor mounted on the substrate, wherein the base may comprise a groove formed on an upper surface, the housing may comprise a groove corresponding to the groove of the base, at least a part of the elastic member may be disposed on at least one of the groove of the base and the groove of the housing, and a damping material may be disposed between a part of the elastic member and the groove of the base, or between a part of the elastic member and the groove of the housing.

A lens driving device according to an exemplary embodiment of the present invention comprises: a housing; a bobbin disposed within the housing; a magnet disposed on the housing; a coil disposed on the bobbin and facing the magnet; and an elastic member coupled with the housing and the bobbin, wherein the elastic member comprises an outer part coupled with the housing, an inner part coupled with the bobbin, and a first connection part connecting the outer part and the inner part, the first connection part may comprise a first extension part extended from the outer part toward the inner part, a second extension part bent or extended from the first extension part and a coupling part connecting the second extension part and the inner part, one or more surfaces of an upper surface and a lower surface of bobbin may be formed with a first groove overlapped with the first connection part to a direction parallel with a central axis of bobbin or an optical axis, the first groove may be additionally formed with a second groove overlapped with the second extension part to a direction parallel with a central axis of bobbin or an optical axis.

The first groove may comprise a "a" groove formed on an upper surface of bobbin and the second groove may comprise a "c" groove formed on an upper surface of bobbin.

The first groove may further comprise a "b" groove formed at a lower surface of bobbin to allow being overlapped with a position formed with the "a" groove, and the second groove may further comprise a "d" groove formed at a lower surface of bobbin to allow being overlapped with a position formed with the "c" groove.

A distance from a floor surface of the "a" groove to an upper surface of bobbin may be same as a distance from a floor surface of the "b" groove to a lower surface of bobbin.

A distance from a bottom surface of the "b" groove to a lower surface of bobbin may be shorter than a distance from a bottom surface of the "a" groove to an upper surface of bobbin.

A distance from a floor surface of the "c" groove to an upper surface of bobbin may be same as a distance from a floor surface of the "d" groove to a lower surface of bobbin.

A distance from a floor surface of the "c" groove to an uppermost surface of bobbin may be different from a distance from a floor surface of the "d" to a lowermost surface of bobbin.

The first extension part may form a right angle with the outer part and may be straightly extended from the outer part toward the inner part, and the second extension part may be extensively formed from the first extension part to a direction disposed with the coupling part based on a position disposed with the first extension part.

The floor surface of the second groove may further comprise a cover part in order not be connected with a coil winding part of the bobbin wound with the coil.

A surface connecting the first groove and the second groove may comprise an inclination.

At least two or more lateral surfaces in the lateral surfaces forming the second groove may be formed with a curved surface.

A camera module according to an exemplary embodiment of the present invention comprises: a PCB (Printed Circuit Board); an image sensor disposed on the PCB; a housing disposed on the PCB; a bobbin disposed within the housing; a lens module coupled with the bobbin and overlapped with the image sensor to an optical axis; a magnet disposed on the housing; a coil disposed on the bobbin and facing the magnet; and an elastic member coupled with the housing and the bobbin, wherein the elastic member may comprise an outer part coupled with the housing, an inner part coupled with the bobbin and a first connection part connecting the outer part and the inner part, and wherein the first connection part may comprise a first extension part extended from the outer part toward the inner part, a second extension part bent or extended from the first extension part and a coupling part connecting the second extension part and the inner part, one or more surfaces of an upper surface and a lower surface of bobbin may be formed with a first groove overlapped with the first connection part to a direction parallel with a central axis of bobbin or an optical axis, the first groove may be additionally formed with a second groove overlapped with the second extension part to a direction parallel with a central axis of bobbin or an optical axis.

Advantageous Effects

The lens driving device according to an exemplary embodiment may be such that a groove of base is accommodated by or disposed with a part of an elastic member elastically supporting a bobbin, and a damping material is coated to restrict the movement of bobbin generated by resonance (oscillation) phenomenon.

Furthermore, the present exemplary embodiment provides a camera module mounted with the lens driving device and an optical instrument mounted with the camera module.

Furthermore, a lens driving device according to the present invention and a camera module including the lens driving device prevents a bobbin and an elastic member from being mutually collided even when the bobbin is tilted by the driving of bobbin and outer shock, such that no damage is generated on the elastic member, and durability of bobbin and elastic member can be lasted longer.

In addition, a lens driving device according to the present invention and a camera module including the lens driving device can restrict generation of foreign objects caused by collision between a bobbin and an elastic member because the bobbin and the elastic member are not mutually collided.

BEST MODE

Figure 1:
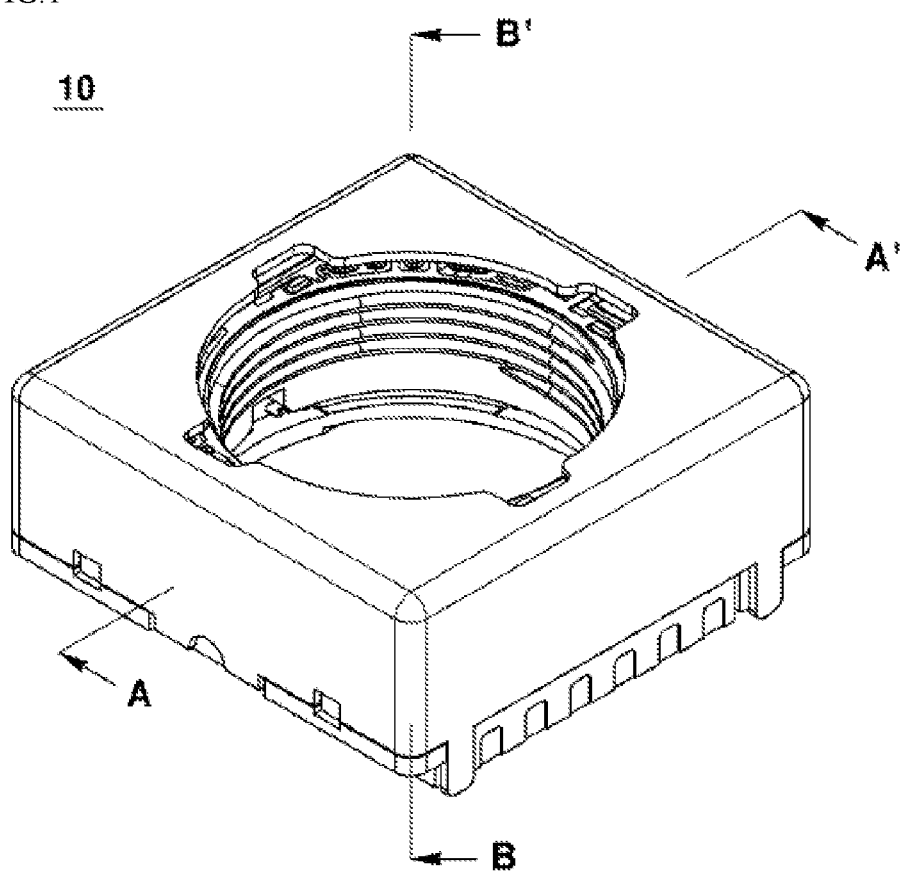
FIG. 1 is a perspective view illustrating a lens driving device according to a first exemplary embodiment of the present invention.

Some exemplary embodiments of present invention will be described in detail with reference to the accompanying drawings. In describing a reference numeral for each element, a same reference numeral will be designated, if possible, for the same element, albeit being differently indicated on other drawings. In the following description, well-known functions or constructions are not described in detail to avoid obscuring the present disclosure in unnecessary detail.

In describing elements in the exemplary embodiments of the present invention, the terms of first, second, A, B (a), (b), etc., may be used. These terms may be used only to distinguish one element from another element, and the nature, order or sequence is not restricted by these terms.

When an element is referred to as being "accessed to", "coupled to," or "connected to," another element, it should be appreciated that the element may be directly accessed, connected or coupled to the other element, or intervening elements may be present therebetween.

The hereinafter-used term of "optical axis direction" may be defined as an optical axis direction of a lens module coupled to a lens driving device. Meantime, the "optical axis direction" may be interchangeably used with a vertical direction, a z axis direction and other directions.

The term of 'auto focus function' used hereinafter may be defined as a function of automatically matching a focus of a subject by adjusting a distance to an image sensor by moving a lens module to an optical axis direction according to a distance to the subject in order to obtain a clear image of the subject from an image sensor. Meantime, the "auto focus" may be interchangeably used with an "AF (Auto Focus)".

Hereinafter, a configuration of an optical instrument according to an exemplary embodiment of the present invention will be described. The optical instrument according to an exemplary embodiment of the present invention may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of capturing an image or a photograph.

The optical instrument according to an exemplary embodiment may comprise a main body (not shown), a display panel (not shown) disposed at one side (one surface) of the main body to display information and a camera module disposed inside of the main body to capture an image or a photograph. The camera module may be electrically connected to the display panel to allow the image or the photograph captured by the camera module to be reproduced from the display panel.

Hereinafter, a camera module according to a first exemplary embodiment of the present invention will be described with reference to the accompanying drawings.

The camera module according to the first exemplary embodiment may comprise a lens module (not shown), an infrared (cut-off) filter (not shown), a substrate (not shown), an image sensor (not shown), a controller (not shown) and a lens driving device (10).

The lens module may comprise a lens and a lens barrel. The lens module may comprise one or more lenses and a lens barrel accommodating the said one or more lenses. However, one element of the lens module is not limited to the lens barrel, and any holder structure capable of supporting one or more lenses may suffice for a lens module. The lens module may be coupled to the lens driving device (10) to move along with the lens driving device (10). The lens module may be disposed inside of a bobbin (500) of the lens driving device (10), for example. In this case, the lens module and an inside of the bobbin (500) may be brought into contact. The lens module may be screw-connected to the bobbin (500). For example, the lens module may be coupled with the bobbin (500) using an adhesive. Meantime, a light having passed the lens module may be irradiated on an image sensor.

The infrared filter may shield a light of infrared region from being incident on an image sensor. The infrared filter may be interposed between the lens module and the image sensor, for example. The infrared filter may be mounted on a hole formed at a center of a base (900). The infrared filter may be formed with a film material, or glass material, for example. The infrared filter may be formed, for example, by allowing an infrared cut-off coating material to be coated on a plate-shaped optical filter such as an imaging plane protection cover glass or a cover glass.

The substrate may be a PCB (Printed Circuit Board). The substrate may support a lens driving device (10). The substrate may be mounted with an image sensor. For example, an inner upper side of the substrate may be disposed with an image sensor, and an outer upper surface of substrate may be disposed with a sensor holder (not shown). An upper side of the sensor holder may be disposed with a lens driving device (10). Alternatively, an upper outside of the substrate may be disposed with a lens driving device (10) and an inner upper side of substrate may be disposed with an image sensor. Through this configuration, a light having passed the lens module accommodated at an inside of the lens driving device (10) may be irradiated on an image sensor mounted on main substrate. The substrate may supply a power to the lens driving device (10). Meantime, the substrate may be disposed with a controller for controlling the lens driving device (10).

The image sensor may be disposed on a substrate. The image sensor may be so disposed as to match in optical axis to a lens module. Through this configuration, the image sensor may obtain a light having passed the lens module. The image sensor may output the irradiated light in an image. The image sensor may be, for example, a CCD (Charge Coupled Device), a MOS (Metal Oxide Semi-Conductor), a CPD and a CID. However, the types of image sensor are not limited thereto The controller may be mounted on the substrate. The controller may be disposed at an outside of the lens driving device (10). However, the controller may be disposed on the lens driving device (10). The controller may individually control a direction, intensity and an amplitude of a current supplied to each element comprising the lens driving device (10). The controller may perform an AF function of the camera module by controlling the lens driving device (10). That is, the controller may move or tilt the lens module to an optical axis direction or to a direction perpendicular to the optical axis direction by controlling the lens driving device (10).

Furthermore the controller may perform a feedback control of the AF function. To be more specific, the controller may receive a position of a bobbin (500) detected by a sensor (400) to perform an accurate AF function by controlling a current or a power applied to a coil (600) (substantial control by feed-backing a position of bobbin).

Hereinafter, a lens driving device (10) according to a first exemplary embodiment will be described with reference to the accompanying drawings.

Figure 2:
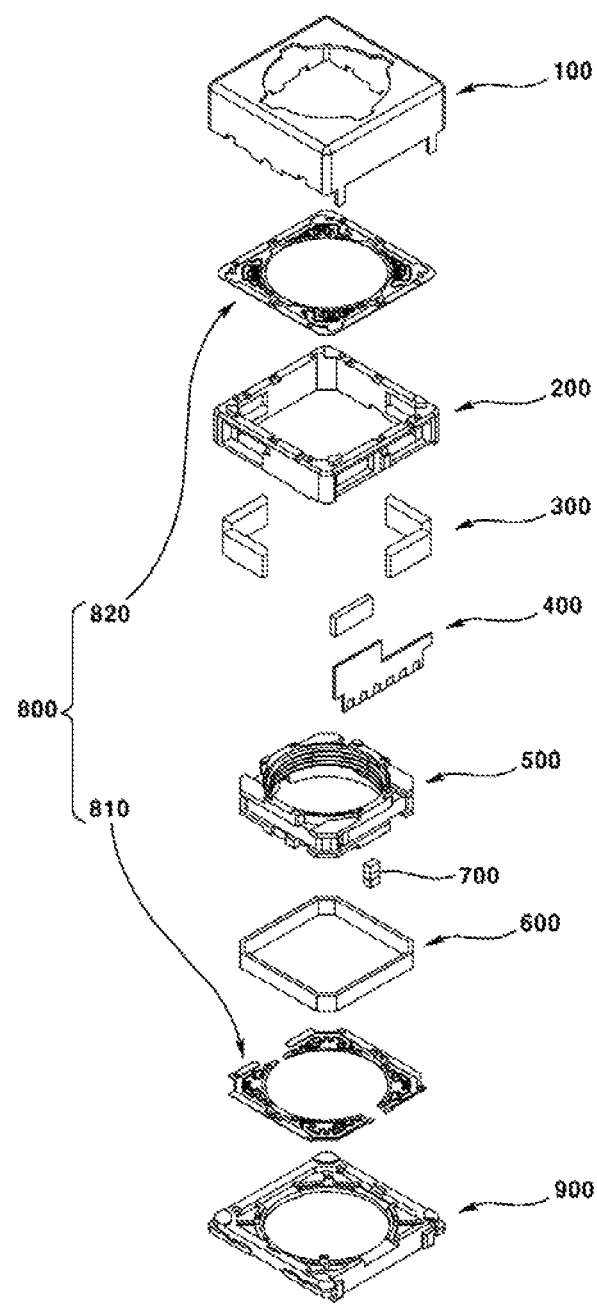
FIG. 2 is an exploded perspective view illustrating a lens driving device according to a first exemplary embodiment of the present invention.
Figure 3:
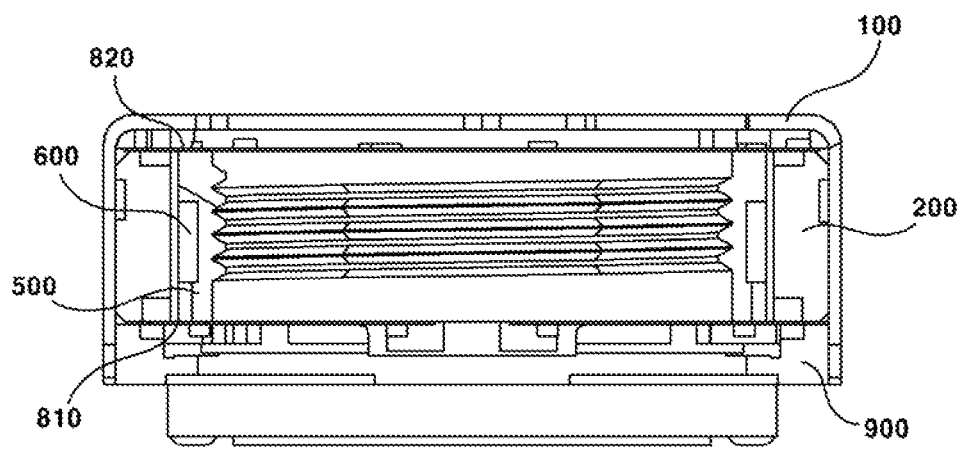
FIG. 3 is a cross-sectional view of a lens driving device taken along line A-A' of FIG. 1 according to a first exemplary embodiment of the present invention.
Figure 4:
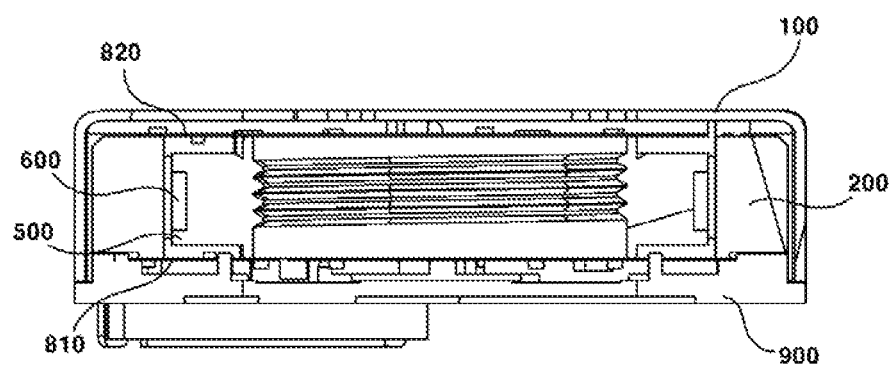
FIG. 4 is a cross-sectional view of a lens driving device taken along Line B-B' of FIG. 1 according to a first exemplary embodiment of the present invention.
Figure 5:
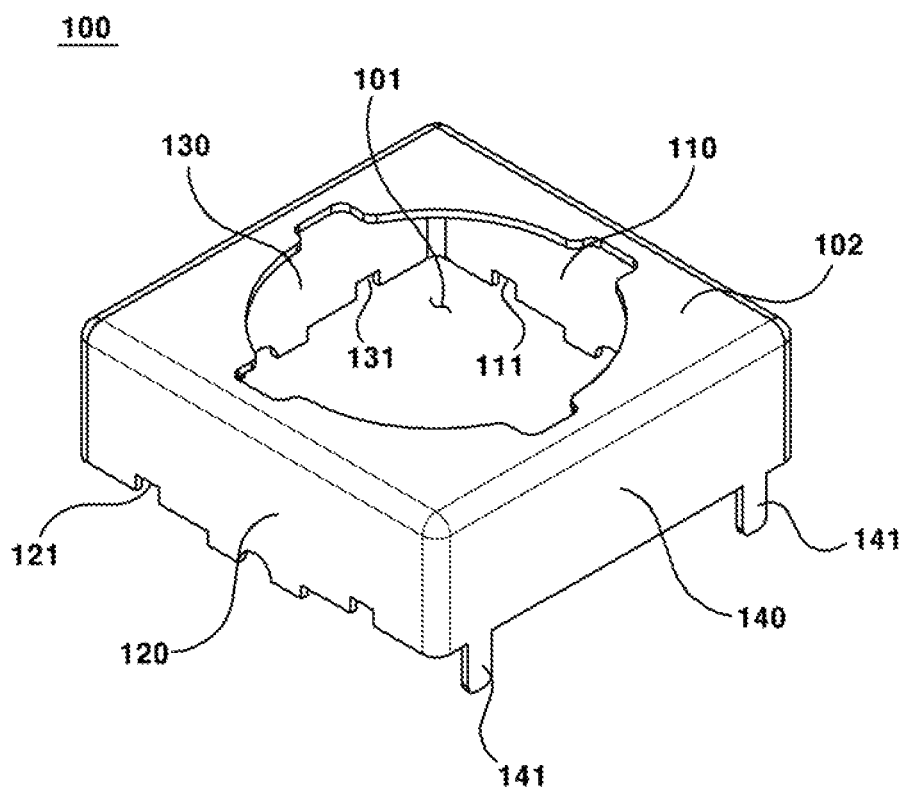
FIG. 5 is a perspective view illustrating a cover of a lens driving device according to a first exemplary embodiment of the present invention.
Figure 6:
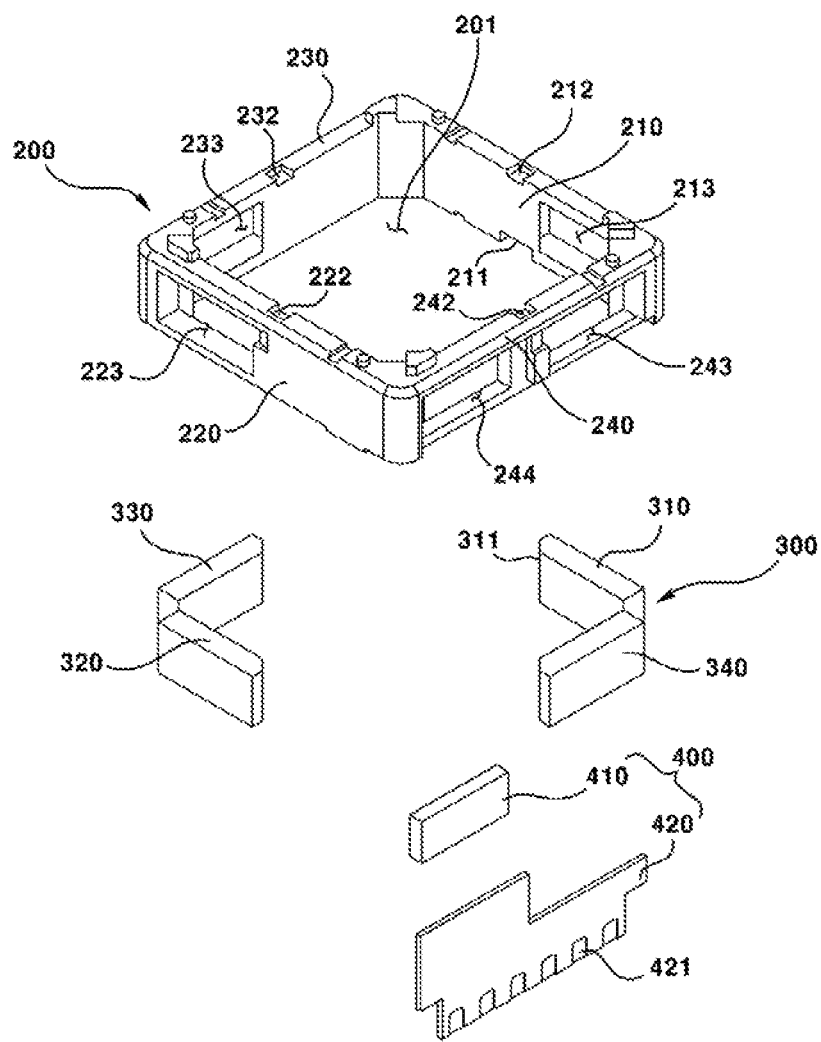
FIG. 6 is an exploded perspective view illustrating a housing, a magnet and a sensor of a lens driving device according to a first exemplary embodiment of the present invention.
Figure 7:
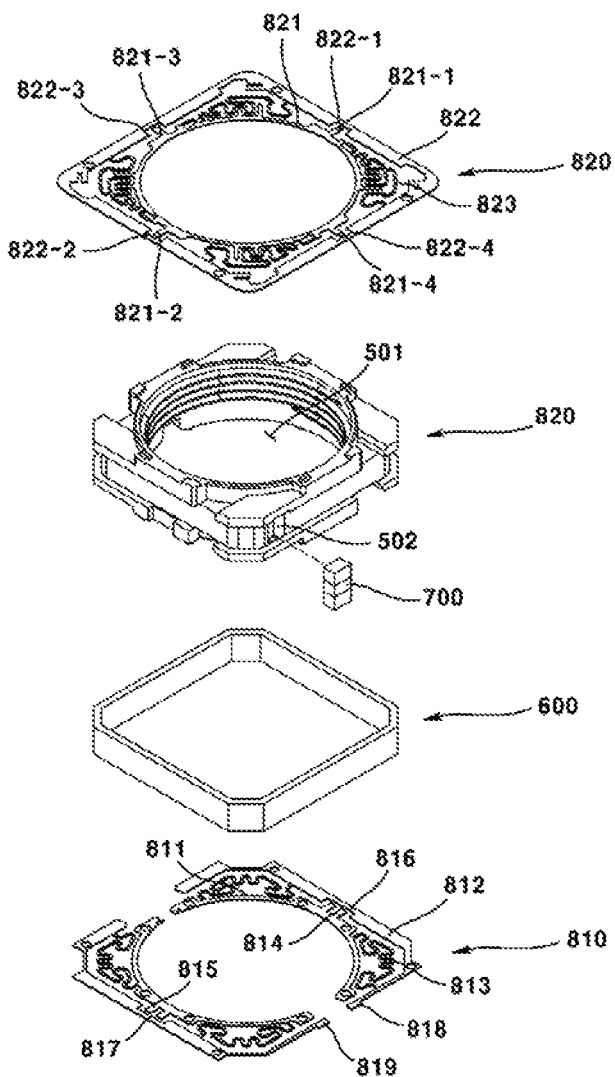
FIG. 7 is an exploded perspective view illustrating a bobbin, a coil, a sensing magnet, a first elastic member and a second elastic member of a lens driving device according to a first exemplary embodiment of the present invention.
Figure 8:
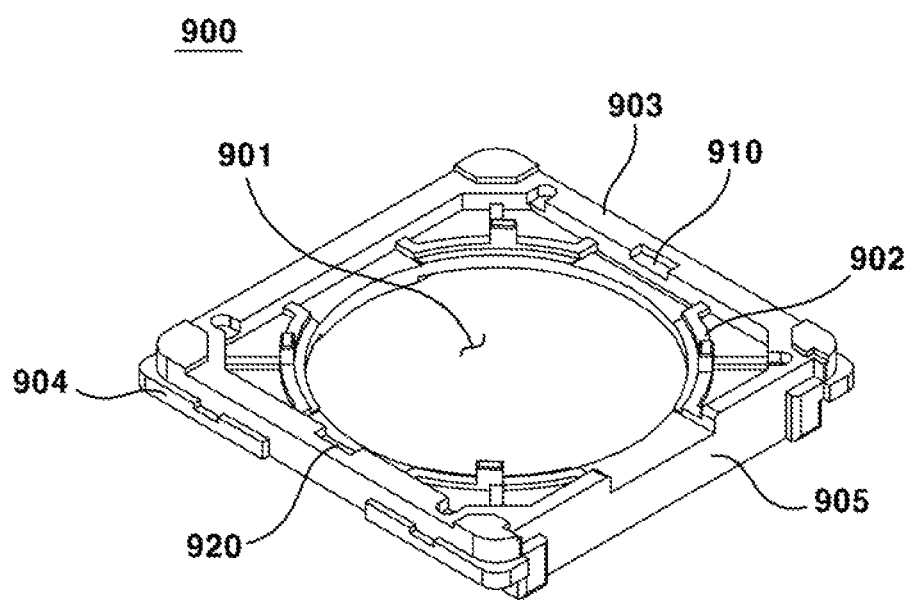
FIG. 8 is a perspective view illustrating a base of a lens driving device according to a first exemplary embodiment of the present invention.
Figure 9:
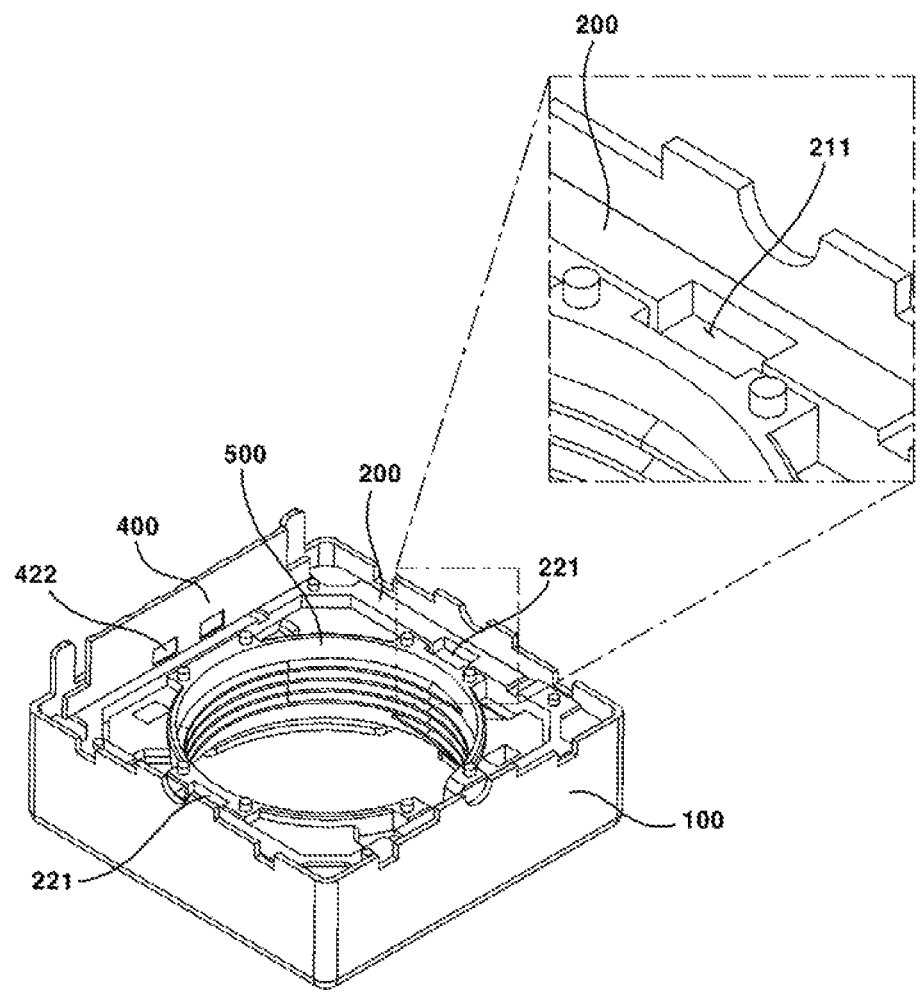
FIG. 9 is a reversed perspective view by removing a first elastic member and a base from a lens driving device according to a first exemplary embodiment of the present invention.
Figure 10:
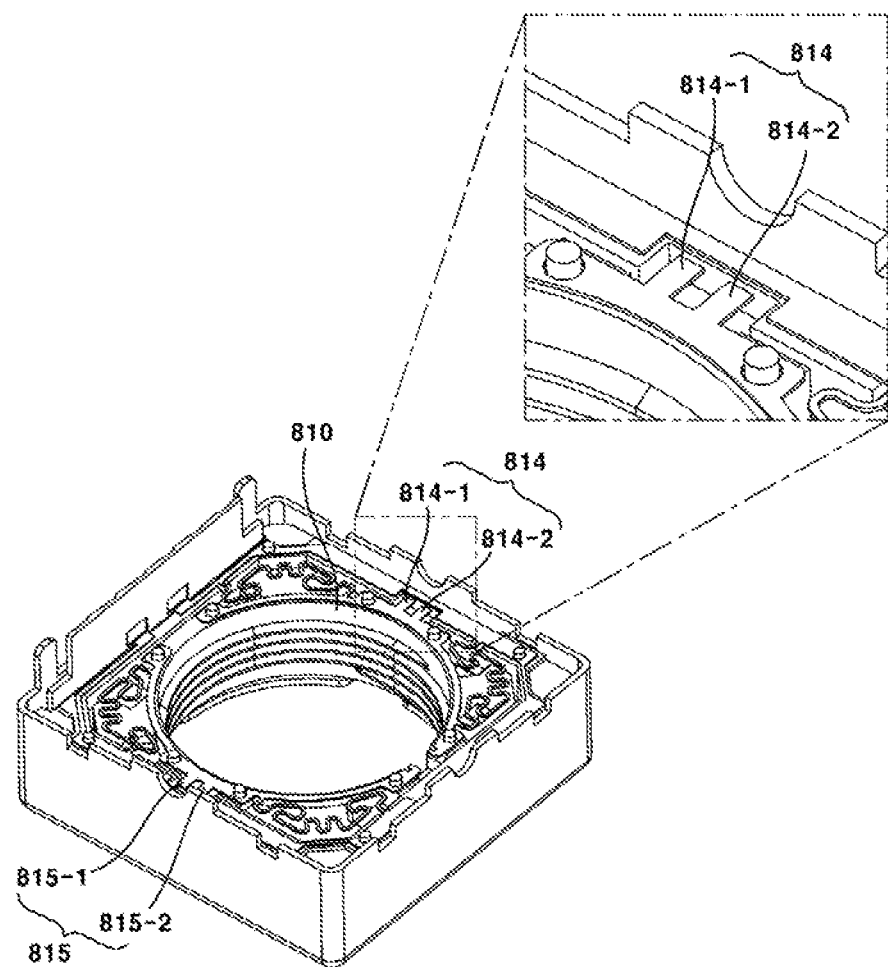
FIG. 10 is a perspective view of a first elastic member mounted to FIG. 9.
Figure 11:
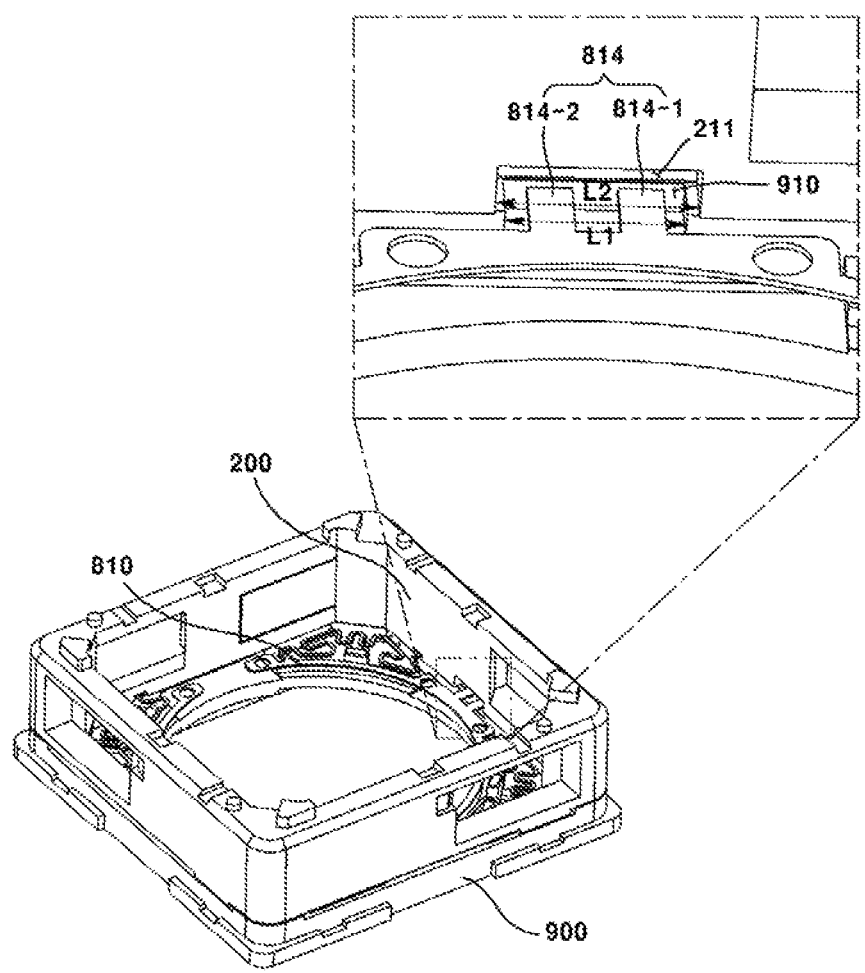
FIG. 11 is a perspective view illustrating a housing, a first elastic member and a base of a lens driving device according to a first exemplary embodiment of the present invention.
Figure 12:
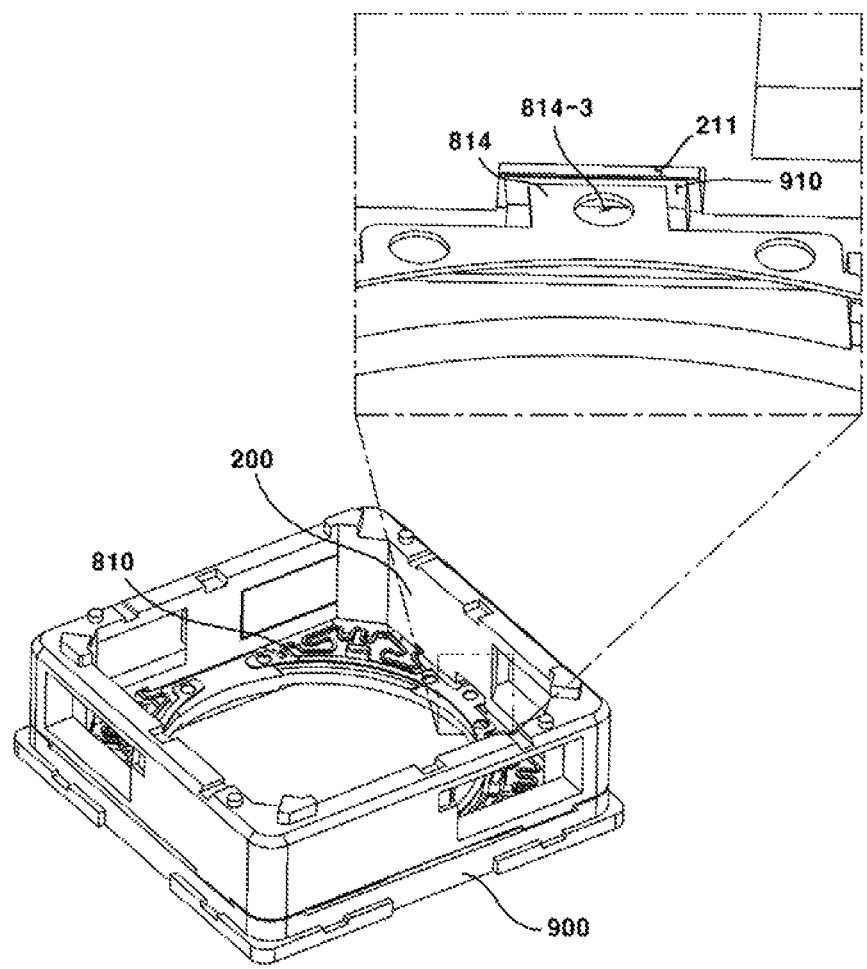
FIG. 12 is a perspective view illustrating a housing, a first elastic member and a base of a lens driving device by a modification according to a first exemplary embodiment of the present invention.
Figure 13:
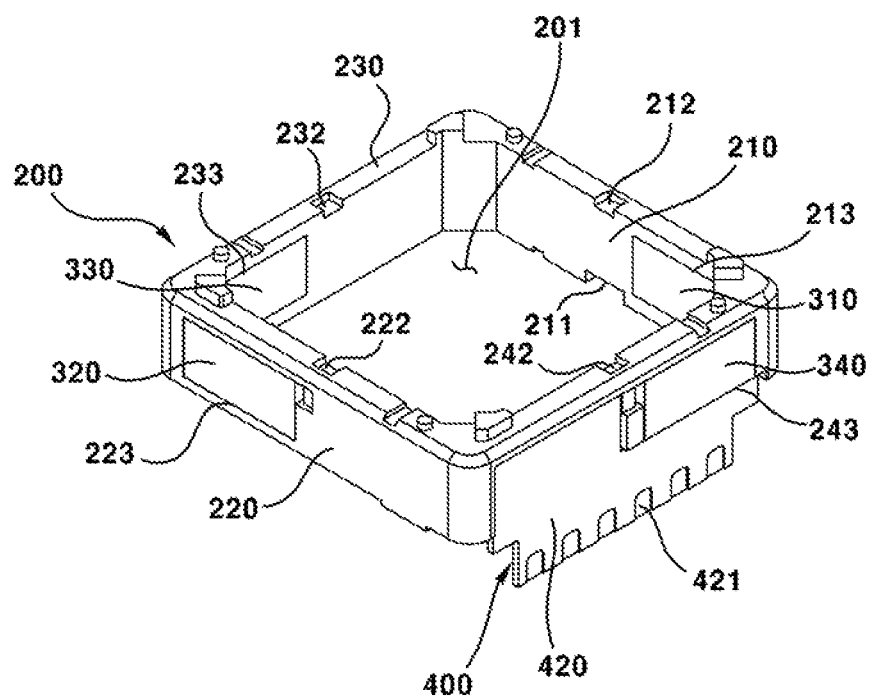
FIG. 13 is a perspective view illustrating a housing, a magnet and a sensor of a lens driving device according to a first exemplary embodiment of the present invention.

FIG. 1 is a perspective view illustrating a lens driving device according to a first exemplary embodiment of the present invention, FIG. 2 is an exploded perspective view illustrating a lens driving device according to a first exemplary embodiment of the present invention, FIG. 3 is a cross-sectional view of a lens driving device taken along line A-A' of FIG. 1 according to a first exemplary embodiment of the present invention, FIG. 4 is a cross-sectional view of a lens driving device taken along Line B-B' of FIG. 1 according to a first exemplary embodiment of the present invention, FIG. 5 is a perspective view illustrating a cover of a lens driving device according to a first exemplary embodiment of the present invention, FIG. 6 is an exploded perspective view illustrating a housing, a magnet and a sensor of a lens driving device according to a first exemplary embodiment of the present invention, FIG. 7 is an exploded perspective view illustrating a bobbin, a coil, a sensing magnet, a first elastic member and a second elastic member of a lens driving device according to a first exemplary embodiment of the present invention, FIG. 8 is a perspective view illustrating a base of a lens driving device according to a first exemplary embodiment of the present invention, FIG. 9 is a reversed perspective view by removing a first elastic member and a base from a lens driving device according to a first exemplary embodiment of the present invention, FIG. 10 is a perspective view of a first elastic member mounted to FIG. 9, FIG. 11 is a perspective view illustrating a housing, a first elastic member and a base of a lens driving device according to a first exemplary embodiment of the present invention, FIG. 12 is a perspective view illustrating a housing, a first elastic member and a base of a lens driving device by a modification according to a first exemplary embodiment of the present invention, and FIG. 13 is a perspective view illustrating a housing, a magnet and a sensor of a lens driving device according to a first exemplary embodiment of the present invention.

The lens driving device (10) according to a first exemplary embodiment may perform an AF function by moving a bobbin (500) (In this case, the lens module is also moved to the optical axis direction along with the bobbin) to an optical axis direction (up/down, vertical direction) in response to an electromagnetic interaction between a magnet (300) and a coil (600). To this end, the bobbin (500) may be elastically supported so as to be moved to an optical axis direction by a first elastic member (810) and a second elastic member (820) (elastically supported to an optical axis direction). The bobbin (500) may perform a bidirectional movement of moving to both an upper side and a lower side, or perform a unidirectional movement of moving to only one side of an upper side or a lower side.

The lens driving device (10) according to a first exemplary embodiment may comprise a cover (100), a housing (200), a magnet (300), a sensor (400), a bobbin (500), a coil (600), a sensing magnet (700), an elastic member (800) and a base (900).

The cover (100) may be an outer member of the lens driving device (10). The cover (100) may take a lower surface-opened cubic shape. Inside of the cover (100) may be disposed with a housing (200), a magnet (300), a sensor (400), a bobbin (500), a coil (600), a sensing magnet (700) and an elastic member (800). The cover (100) may be disposed thereunder with a base (900). The cover (100) may be supported by the (900). The cover (100) may be coupled to the base (900) by an adhesive.

The material of cover (100) may comprise a metal. In this case, the cover (100) may prevent an outer electronic wave from entering thereinside or prevent an inner electronic wave from being discharged to outside. That is, the cover (100) can shield an electronic wave. Thus, the cover (100) may be called as a "shield can". However, the material of cover (100) is not limited thereto. For example, a material of cover (100) may comprise a plastic. In this case, the cover (100) may be manufactured by plastic injection.

The cover (100) may comprise an upper plate (102), a first lateral plate (110), a second plate (120), a third plate (130), a fourth plate (140), a first groove (111), a second groove (121), a third groove (131) and a ground terminal (141).

The upper plate (102) may take a square plated shape. The upper plate (102) may form an upper surface of cover (100). A center of upper plate (102) may be formed with a hole (101) for providing a light path. The hole (101) of cover (100) may be so disposed as to be aligned with an optical axis. Each of four sides on the upper plate (102) may be disposed with a first lateral plate (110), a second lateral plate (120), a third lateral plate (130) and a fourth lateral plate (140).

The first lateral plate (110) may be downwardly extended from a first side of the upper plate (102). The second lateral plate (120) may be downwardly extended from a second side of the upper plate (102). The third lateral plate (130) may be downwardly extended from a third side of the upper plate (102). The fourth lateral plate (140) may be downwardly extended from a fourth side of the upper plate (102).

The first lateral plate (110) and the second lateral plate (120) may be so disposed as to face each other (An opposite side of first lateral plate may be disposed with the second lateral plate, and vice versa). The third lateral plate (130) and the fourth lateral plate (140) may be so disposed as to face each other (An opposite side of third lateral plate may be disposed with the fourth lateral plate, and vice versa). The first lateral plate (110) and the second lateral plate (120) may be connected by the third lateral plate (130) and the fourth lateral plate (140), and vice versa. The first lateral plate (110) and the second lateral plate (120) may be so disposed as to be mutually parallel to each other. The third lateral plate (130) and the fourth lateral plate (140) may be so disposed as to be mutually parallel to each other.

The first lateral plate (110) and the third lateral plate (130) may be disposed across a first corner. The first lateral plate (110) and the third lateral plate (130) may be adjacently disposed therebetween. The first lateral plate (110) and the fourth lateral plate (140) may be disposed across a fourth corner. The first lateral plate (110) and the fourth lateral plate (140) may be adjacently disposed therebetween.

The second lateral plate (120) and the third lateral plate (130) may be disposed across a second corner. The second lateral plate (120) and the third lateral plate (130) may be adjacently disposed therebetween. The second lateral plate (120) and the fourth lateral plate (140) may be disposed across a third corner. The second lateral plate (120) and the fourth lateral plate (140) may be adjacently disposed therebetween.

The first lateral plate (110), the second lateral plate (120), the third lateral plate (130) and the fourth lateral plate (140) may be disposed on a staircase (904) of base (900). A lower surface of the first lateral plate (110), the second lateral plate (120), the third lateral plate (130) and the fourth lateral plate (140) may face an upper surface of staircase (904) of base (900). The first lateral plate (110), the second lateral plate (120), the third lateral plate (130) and the fourth lateral plate (140) may be coupled with the staircase (904) of base (900). In this case, an adhesive may be coated between a lower surface of the first lateral plate (110), the second lateral plate (120), the third lateral plate (130) and the fourth lateral plate (140) and an upper surface of staircase (904) of base (900).

In order to coat the adhesive, a lower surface of first lateral plate (110) may be formed with one or more first grooves (111). Likewise, a lower surface of second lateral plate (120) may be formed with one or more second grooves (121), and a lower surface of third lateral plate (130) may be formed with one or more third grooves (131).

The ground terminal (141) may be disposed at a lower surface of fourth lateral plate (140). The ground terminal (141) may be downwardly protruded from a lower surface of fourth lateral plate (140). The ground terminal (141) may be formed in a plural number. The plurality of ground terminals (141) may be mutually spaced apart to a direction formed with a lower side of the fourth lateral plate (140). The ground terminal (141) may be electrically connected to a substrate of camera module. As a result, residual electronic wave accumulated on the cover (100) may be discharged to outside through the ground terminal (141).

The housing (200) may comprise a plastic material. The housing (200) may be manufactured by plastic insert injection method. That is, the housing (200) may be a plastic injection. The housing (200) may take a hollowed shape centrally formed with a hole (201). The hole (201) of housing (200) may be disposed with a bobbin (500). That is, the bobbin (500) may be disposed inside of the housing (200). The housing (200) may be disposed with a magnet (300). The housing (200) may be coupled with an elastic member (800). In this case, the housing (200) may be disposed thereunder with a first elastic member (810). The housing (200) may be disposed thereon with a second elastic member (820). The housing (200) may be disposed thereunder with a base (900). The first elastic member (810) may be interposed between the housing (200) and the base (900).

The housing (200) may comprise a first lateral part (210), a second lateral part (220), a third lateral part (230), a fourth lateral part (240), a first groove, a second groove, a first reception part (213), a second reception part (223), a third reception part (233), a fourth reception part (243) and a fifth reception part (244).

The first lateral part (210) and the second lateral part (220) may face each other across the magnet (300), the bobbin (500) and the coil (600) (The second lateral part may be disposed on an opposite side of first lateral part, and vice versa). The third lateral part (230) and the fourth lateral part (240) may face each other across the magnet (300), the bobbin (500) and the coil (600) (The fourth lateral part may be disposed on an opposite side of third lateral part, and vice versa).

The first lateral part (210) may be so disposed as to correspond with (face) the first lateral plate (110) of cover (100). The second lateral part (210) may correspond to (face) the second lateral plate (120) of cover (100). The third lateral part (230) may correspond to (face) the third lateral plate (130) of cover (100). The fourth lateral part (240) may correspond to (face) the fourth lateral plate (140) of cover (100).

The first groove of housing (200) may be formed at a lower surface of housing (200). The first groove of housing (200) may be upwardly extended from a lower surface of housing (200). The first groove of housing (200) may be outwardly extended from an inner lateral surface of housing (200). The first groove of housing (200) may be overlapped, for at least a part thereof, with a groove of base (900) to a vertical direction (optical axis direction, up/down direction). The first groove of housing (200) may be connected, for at least a part thereof, to a groove of base (900). In this case, a lower end of the housing (200) and an upper end of groove of base (900) may be connected.

The first groove of housing (200) may be disposed with at least a part of protrusion of the first elastic member (810). The first groove of housing (200) may be disposed with a damping material. That is, the first groove of housing (200) and a groove of base (900) may be filled with a damping material and disposed with a protrusion of the first elastic member (810).

The damping material may be an adhesive material. For example, the damping material may be a thermosetting epoxy. As a result, the damping material may adhere the protrusion of the first elastic member (810), and the bobbin (500) supported by the first elastic member (810) may be also stably fixed against an outer force of a predetermined level. The damping material may be adhered to the elastic member (800), the base (900) and/or the housing (200).

As a result, the resonance (oscillation) phenomenon of bobbin (500) can be restricted. In this case, because the first groove of housing (200) and the groove of base (900) are connected, the damping material can be sufficiently coated to a vertical direction (optical axis direction, up/down direction) to allow the bobbin (500) to be in a stable state no matter wherever the bobbin is positioned. Furthermore, because the first groove of housing (200) and the groove of base (900) are connected, a reception space for damping material can be sufficiently secured. As a result, contamination of ambient environment due to overflow of damping material can be prevented. The first groove of housing (200) may comprise a 1-1 groove (211) and a 1-2 groove (221) (See FIGS. 9, 10, 11). The 1-1 groove (211) of housing (200) may be disposed at a lower surface of the first lateral part (210) of housing (200). The 1-2 groove (221) of housing (200) may be disposed at a lower surface of second lateral part (220) of housing (200).

Thus, the 1-1 groove (211) and the 1-2 groove (221) of housing (200) may be symmetrically disposed about a center axis (optical axis) of housing (200). The 1-1 groove (211) of housing (200) may be disposed opposite to the 1-2 groove (221) of housing (200) and vice versa. The 1-1 groove (211) and the 1-2 groove (221) of housing (200) may be disposed on an imaginary straight line which is perpendicular to the optical axis.

The 1-1 groove (211) of housing (200) may be disposed with a first protrusion (814) of first elastic member (810). The 1-2 groove (221) of housing (200) may be disposed with a second protrusion (815) of first elastic member (810). The 1-1 groove (211) of housing (200) may correspond to (face) the first lateral plate (110) of cover (100). The 1-2 groove (221) of housing (200) may correspond to (face) the second lateral plate (120) of cover (100).

The 1-1 groove (211) of housing (200) may be upwardly extended from a lower surface of housing (200), and may be extended from an inner lateral surface of housing (200) toward an area where the first lateral plate (110) of cover (100) is located. The 1-2 groove (221) of housing (200) may be upwardly extended from a lower surface of housing (200), and may be extended from an inner lateral surface of housing (200) toward an area where the second lateral plate (120) of cover (100) is located.

The 1-1 groove (211) of housing (200) may be overlapped with the first groove (910) of base (900) to a vertical direction (up/down direction, optical axis direction). That is, a lower end of the 1-1 groove (211) of housing (200) and an upper end of first groove (910) of base (900) may be connected. The 1-2 groove (221) of housing (200) may be overlapped with the second groove (920) of base (900) to a vertical direction (up/down direction, optical axis direction). That is, a lower end of the 1-2 groove (221) of housing (200) and an upper end of second groove (920) of base (900) may be connected.

The 1-1 groove (211) of housing (200) and the first groove (910) of base (900) may be filled with damping material, and at least a part of the first protrusion (814) of first elastic member (810) may be disposed (accommodated) on at least one of the 1-1 groove (211) of housing (200) and the first groove (910) of base (900). The 1-2 groove (221) of housing (200) and the second groove (920) of base (900) may be filled with damping material, and at least a part of the second protrusion (815) of second elastic member (820) may be disposed (accommodated) on at least one of the 1-2 groove (221) of housing (200) and the second groove (920) of base (900).

In sum, the bobbin (500) may be stably fixed on both sides (bi-direction) by the first protrusion (814) and the second protrusion (815) of first elastic member (810). As a result, the bobbin (500) may be prevented from being tilted to a direction perpendicular to an optical axis.

The second groove of housing (200) may be disposed on an upper surface of housing (200). The second groove of housing (200) may be downwardly extended from an upper surface of housing (200). The second groove of housing (200) may be outwardly extended from an inner lateral surface of housing (200). The second groove of housing (200) may be disposed with at least a part of the protrusion of the second elastic member (820). The second groove of housing (200) may be coated with damping material. That is, the second groove of housing (200) may be filled with damping material, and may be disposed with a protrusion of the second elastic member (820).

The damping material may adhere the protrusion of the second elastic member (820), and the bobbin (500) supported by the second elastic member (820) may be also stably fixed against an outer force of a predetermined level. As a result, the resonance (oscillation) phenomenon of bobbin (500) can be restricted.

The second groove of housing (200) may comprise a 2-1 groove (212), a 2-2 groove (222), a 2-3 groove (232) and a 2-4 groove (242). The 2-1 groove (212) of housing (200) may be disposed on an upper surface of the first lateral part (210) of housing (200). The 2-2 groove (222) of housing (200) may be disposed on an upper surface of the second lateral part (220) of housing (200). The 2-3 groove (232) of housing (200) may be disposed on an upper surface of the third lateral part (230) of housing (200). The 2-4 groove (242) of housing (200) may be disposed on an upper surface of the fourth lateral part (240) of housing (200).

Thus, the 2-1 groove (212) and the 2-2 groove (222) of housing (200) may be symmetrically disposed about a central axis (optical axis) of housing (200). The 2-1 groove (212) of housing (200) may be disposed opposite to the 2-2 groove (222) of housing (200), and vice versa. The 2-1 groove (212) and the 2-2 groove (222) of housing (200) may be disposed on an imaginary straight line which is perpendicular to an optical axis. Furthermore, the 2-3 groove (232) and the 2-4 groove (242) of housing (200) may be symmetrically disposed about a central axis (optical axis) of housing (200). The 2-3 groove (212) of housing (200) may be disposed opposite to the 2-4 groove (242) of housing (200), and vice versa. The 2-3 groove (232) and the 2-4 groove (242) of housing (200) may be disposed on an imaginary straight line which is perpendicular to an optical axis.

The 2-1 groove (212) of housing (200) may be disposed with a first protrusion (822-1) of the second elastic member (820). The 2-2 groove (222) of housing (200) may be disposed with a second protrusion (822-2) of the second elastic member (820). The 2-3 groove (232) of housing (200) may be disposed with a third protrusion (822-3) of the second elastic member (820). The 2-4 groove (242) of housing (200) may be disposed with a fourth protrusion (822-4) of the second elastic member (820).

The 2-1 groove (212) of housing (200) may be so disposed as to correspond with (face) the first lateral plate (110) of cover (100). The 2-2 groove (222) of housing (200) may be so disposed as to correspond with (face) the second lateral plate (120) of cover (100). The 2-3 groove (232) of housing (200) may be so disposed as to correspond with (face) the third lateral plate (130) of cover (100). The 2-4 groove (242)

of housing (200) may be so disposed as to correspond with (face) the fourth lateral plate (140) of cover (100).

The 2-1 groove (212) of housing (200) may be downwardly extended from an upper surface of housing (200), and may be extended from an inner lateral surface of housing (200) toward an area where the first lateral plate (110) of cover (100) is situated. The 2-2 groove (222) of housing (200) may be downwardly extended from an upper surface of housing (200), and may be extended from an inner lateral surface of housing (200) toward an area where the second lateral plate (120) of cover (100) is situated.

The 2-3 groove (232) of housing (200) may be downwardly extended from an upper surface of housing (200), and may be extended from an inner lateral surface of housing (200) toward an area where the third lateral plate (130) of cover (100) is situated. The 2-4 groove (242) of housing (200) may be downwardly extended from an upper surface of housing (200), and may be extended from an inner lateral surface of housing (200) toward an area where the fourth lateral plate (140) of cover (100) is situated.

The 2-1 groove (212), the 2-2 groove (222), the 2-3 groove (232) and the 2-4 groove (242) of housing (200) may be filled with damping material. At least a part (an outer end) of the first protrusion (822-1) at the second elastic member (820) may be disposed at the 2-1 groove (212) of housing (200), at least a part (an outer end) of the second protrusion (822-2) at the second elastic member (820) may be disposed at the 2-2 groove (212) of housing (200), at least a part (an outer end) of the third protrusion (822-3) at the second elastic member (820) may be disposed at the 2-3 groove (232) of housing (200), and at least a part (an outer end) of the fourth protrusion (822-4) at the second elastic member (820) may be disposed at the 2-4 groove (242) of housing (200).

In sum, the bobbin (500) may be stably fixed on all four sides (four directions) by the first protrusion (822-1), the second protrusion (822-2), the third protrusion (822-3) and the fourth protrusion (822-4) of second elastic member (820). As a result, the bobbin (500) may be prevented from being tilted toward a direction perpendicular to an optical axis.

The first reception part (213) of housing (200) may be formed at a first lateral part (210) of housing (200). The first reception part (213) of housing (200) may be a hole passed through by the first lateral part (210) of housing (200). The first reception part (213) of housing (200) may be more adjacently disposed to the fourth lateral part (240) than to the third lateral part (230) of housing (200). The first reception part (213) of housing (200) may be disposed with a first magnet (310).

The second reception part (223) of housing (200) may be formed at a second lateral part (220) of housing (200). The second reception part (223) of housing (200) may be a hole passed through by the second lateral part (220) of housing (200). The second reception part (223) of housing (200) may be more adjacently disposed to the third lateral part (230) than to the fourth lateral part (240) of housing (200). The second reception part (223) of housing (200) may be disposed with a second magnet (310).

The third reception part (233) of housing (200) may be formed at a third lateral part (230) of housing (200). The third reception part (233) of housing (200) may be a hole passed through by the third lateral part (230) of housing (200). The third reception part (233) of housing (200) may be more adjacently disposed to the second lateral part (220) than to the first lateral part (210) of housing (200). The third reception part (233) of housing (200) may be disposed with a third magnet (330).

The fourth reception part (243) of housing (200) may be formed at a fourth lateral part (240) of housing (200). The fourth reception part (243) of housing (200) may be a hole passed through by the fourth lateral part (240) of housing (200). The fourth reception part (243) of housing (200) may be more adjacently disposed to the first lateral part (210) than to the second lateral part (220) of housing (200). The fourth reception part (243) of housing (200) may be disposed with a fourth magnet (340).

A fifth reception part (244) of housing (200) may be formed at a fourth lateral part (240) of housing (200). The fifth reception part (244) of housing (200) may be a hole passed through by the fourth lateral part (240) of housing (200). The fifth reception part (244) of housing (200) may be disposed more adjacently to the second lateral part (220) of housing (200) than to the first lateral part (210) of housing (200). The fifth reception part (244) of housing (200) may be disposed with a sensing element part (410) of sensor (400).

The fourth reception part (243) of housing (200) and the fifth reception part (244) of housing (200) may be spaced apart from each other. The fourth reception part (243) of housing (200) and the fifth reception part (244) of housing (200) may be adjacently disposed.

The magnet (300) may be disposed at the housing (200). The magnet (300) may be so disposed as to face the coil (600). When a power is applied to the coil (600), the magnet (300) and the coil (600) may electromagnetically interact. In this case, the bobbin (500) may be moved to an optical axis direction along with the lens module to perform the AF function. Meantime, a driving force of bobbin (500) provided by the electromagnetic interaction between the magnet (300) and the coil (600) may overpower the fixing power (resistance) of bobbin (500) by the damping material, such that the AF driving of bobbin (500) may not be restricted by the adhesive power of damping material.

The magnet (300) may comprise a first magnet (310), a second magnet (320), a third magnet (33) and a fourth magnet (340). The first magnet (310) may be accommodated into the first reception part (213) of housing (200). The second magnet (320) may be accommodated into the second reception part (223) of housing (200). The third magnet (330) may be accommodated into the third reception part (233) of housing (200). The fourth magnet (340) may be accommodated into the fourth reception part (243) of housing (200). In this case, the first magnet (310) may be disposed closest to the fourth magnet, and vice versa. Furthermore, the second magnet (320) may be disposed closest to the third magnet (330), and vice versa.

The first magnet (310) and the fourth magnet (340) may be disposed at a right angle when viewed from above. The second magnet (320) and the third magnet (330) may be disposed at a right angle when viewed from above.

The magnet (300) may comprise a chamfer surface (311) formed at one lateral surface of magnet (300). The chamfer surface (311) may be formed with a shape corresponding to that of a chamfer surface of housing (200). That is, the chamfer surface (311) of magnet (300) may be fixed by being surface-contacted with a chamfer surface of housing (200).

The sensor (400) may obtain position information of bobbin (500) by detecting a magnetic force of sensing magnet (700). Toward this end, the sensor (400) may face the sensing magnet (700) disposed at an inside of coil (600). The sensor (400) may be disposed on the housing (200). The sensor (400) may be disposed on the fourth lateral part (240) of housing (200). The sensor (400) may be disposed on the fifth reception part (244) of fourth lateral part (240) of housing (200).

The sensor (400) may be electrically connected to a substrate of camera module. The sensor (400) may transmit an electric/electronic signal on the position information of bobbin (500) to the substrate of camera module. The sensor (400) may be electrically connected to the second elastic member (820). A power outputted from the substrate of camera module may be transmitted to the coil (600) through the sensor (400) and the second elastic member (820). However, while the sensor (400) is omitted, the second elastic member (820) may be electrically connected to the substrate of camera module. In this case, the power outputted from the substrate of camera module may be directly transmitted to the coil (600) through the second elastic member (820).

The substrate of camera module may control the intensity, waveform and direction of a current applied to the coil (600) by feed-backing the position information of bobbin (500).

The sensor (400) may comprise a sensing element part (410) and a connection substrate (420). The sensing element part (410) may detect a magnetic force of sensing magnet (700). The sensing element part (410) may be a Hall sensor. The sensing element part (410) may be mounted on an inner lateral surface of connection substrate (420). The sensing element part (410) may be accommodated into the fifth reception part (244) of fourth lateral part (240) of housing (200). The sensing element part (410) may face a sensing magnet (700) disposed at an inside of coil (600).

The connection substrate (420) may be a PCB (Printed Circuit Board). The connection substrate (420) may be an FPCB (Flexible Printed Circuit Board). The connection substrate (420) may be disposed on an outer lateral surface of fourth lateral part (240) of housing (200). The connection substrate (420) may be downwardly extended from the fourth lateral pat (240) of housing (200). A lower surface of connection substrate (420) may be accommodated into a reception part (905) of base (900). A part of the connection substrate (420) may be disposed underneath the magnet (300). In a modification, a part of the connection substrate (420) may cover at least an outer surface of magnet (300).

An inner lateral surface of connection substrate (420) may be mounted with a sensing element part (410). An outer lateral surface of connection substrate (420) may face a fourth lateral plate (140) of cover (100).

The connection substrate (420) may be electrically connected to a substrate of camera module. Toward this end, a lower surface of the outer lateral surface of connection substrate (420) may be formed with a plurality of first terminals (421). The first terminal (421) of connection substrate (420) may be in the number of six (6). Two current circuits are required for sensing of the sensing element part (410). Four first terminals out of six first terminals (421) of connection substrate (420) may be input (Input, VCC) and output (Output, Ground) terminals for the said two current circuits of sensing element part (410). Remaining two first terminals out of six first terminals (421) of the connection substrate (420) may be test terminals for current test.

The connection substrate (420) may be electrically connected to a first elastic member (810). Toward this end, a lower surface of inner lateral surface of connection substrate (420) may be formed with a plurality of second terminals (422) (See FIG. 9). The second terminal (422) of connection substrate (420) may be in the number of two. The two second terminals (422) of connection substrate (420) may be respectively electrically connected to a first terminal (818) and a second terminal (819) of first elastic member (810). A current generated from the substrate of camera module may be transmitted to the coil (600) through the connection substrate (420) and the first elastic member (810).

The sensor (400) can accurately determine the position of bobbin (500). The AF function can be more accurately implemented through feedback of position of bobbin (500) by the sensor (400). However, the current flowing in the sensor (400) may be a cause of oscillation (resonance) phenomenon of bobbin (500). In order to solve the said problem in the first exemplary embodiment, a protrusion is formed on the elastic member (800) elastically supporting the bobbin (500) and a damping material is adhered to thereby prevent the movement of bobbin (500).

The bobbin (500) may comprise a plastic material. The bobbin (500) may be manufactured by plastic insert injection method. That is, the bobbin (500) may be a plastic injection.

The bobbin (500) may be applied with a driving force through electromagnetic interaction between the magnet (300) and the coil (600). The bobbin (500) may be moved to an optical axis direction. In this case, the bobbin (500) may integrally move along with the lens module of camera module to perform the AF function.

The bobbin (500) may take a hollowed shape centrally formed with a hole (501). The hole (501) of bobbin (500) may be disposed with a lens module of camera module. That is, a lens module may be disposed inside of the bobbin (500). The bobbin (500) may be disposed with a coil (600). An outer lateral surface of bobbin (500) may be disposed with a coil (600). The bobbin (500) may be disposed with a sensing magnet (700). In this case, the sensing magnet (700) may be disposed inside of coil (600) and may face each other across the sensing element part (410) of sensor (400) and coil (600).

Underneath the bobbin (500), there may be disposed with a first elastic member (810). The bobbin (500) may be coupled with the first elastic member (810). The bobbin (500) may be elastically supported by the first elastic member (810) to an optical axis direction (vertical direction, up/down direction).

Above the bobbin (500), there may be disposed with a second elastic member (820). The bobbin (500) may be coupled with a second elastic member (820). The bobbin (500) may be elastically supported by the second elastic member (820) to an optical axis direction (vertical direction, up/down direction).

The bobbin (500) may be guided by the first and second elastic members (810, 820) to an optical axis direction (vertical direction, up/down direction. An outer circumferential surface of bobbin (500) may be disposed with a pocket (502). The pocket (502) of bobbin (500) may be inwardly formed from an outer circumferential surface. The pocket (502) of bobbin (500) may be accommodated by the sensing magnet (700).

The coil (600) may be a coil block wound on an outer circumferential surface of bobbin (500). The coil (600) may be so disposed as to face the magnet (300). When a current is applied to the coil (600), the coil may be provided with a driving force in response to an electromagnetic interaction with the magnet (300). The coil (600) may be electrically connected to the first elastic member (810). One end of a side of the coil (500) and one end of the other side may be extracted from the coil block. The one end of one side of coil (500) may be electrically connected to a first member of first elastic member (810). The end of the other side of coil (500)

may be electrically connected to a second member of first elastic member (810). The coil (500), the first elastic member (810) and the connection substrate (410) of sensor (400) may form a circuit. To this end, the first elastic member (810) is divided into mutually spaced-apart first member and second member. A power supplied from the substrate of camera module may be supplied to the circuit through the connection substrate (410).

Meantime, a position of magnet (300) and a position of coil (600) may be mutually changed. That is, the coil (600) may be disposed on the housing (200), and the magnet (300) may be disposed on the bobbin (500).

The elastic member (800) may be a leaf spring (plate spring). The elastic member (800) may be coupled with the housing (200) and the bobbin (500). The elastic member (800) may elastically connect the housing (200) and the bobbin (500). The elastic member (800) may elastically support the bobbin (500) to an optical axis direction (vertical direction, up/down direction). At least a part (at least a part of protrusion, an end of outside of protrusion) of the elastic member (800) may be disposed on at least one of a first groove of housing (200) and a groove of base (900). The at least part of the elastic member (at least a part of protrusion, an end of outside of protrusion) of the elastic member (800) may be disposed on a second groove of housing (200). The first groove of housing (200) and the groove of base (900) may be filled with a damping material, and the second groove of housing (200) may be filled with a damping material. As a result, the protrusion of elastic member (800) may be adhered by the damping material, and the bobbin (500) may obtain a predetermined level of stability. As a result, the resonance (oscillation) phenomenon of bobbin (500) may be restricted. However, the driving force generated by the electromagnetic interaction between the magnet (300) and the coil (600) may overrule the resistance caused by the protrusion of the elastic member, such that the bobbin (500) may be driven to an optical axis direction (vertical direction, up/down direction) to perform the AF function. The elastic member (800) may comprise a first elastic member (810) and a second elastic member (820).

The first elastic member (810) may be disposed underneath the housing (200) and the bobbin (500). The first elastic member (810) may be disposed at a lower surface of housing (200) and a lower surface of bobbin (500). The first elastic member (810) may be coupled to a lower surface of housing (200) and a lower surface of bobbin (500). The first elastic member (810) may elastically connect the housing (200) and the bobbin (500) to elastically support the bobbin (500). The first elastic member (810) may be divided into a first member and a second member. The first member and the second member may be respectively electrically connected to an end of one side and an end of the other side of coil (600). As a result, a single circuit may be formed to prevent generation of electrical short-circuit.

The first elastic member (810) may comprise a first inner elastic part (811), a first outer elastic part (812) and a first connection elastic part (813). In this case, the first inner elastic part (811), the first outer elastic part (812) and the first connection elastic part (813) may be disposed on the first member and the second member of first elastic member (810).

The first inner elastic part (811) may be disposed underneath the bobbin (500). The first inner elastic part (811) may be disposed a lower surface of bobbin (500). The first inner elastic part (811) may be coupled with the bobbin (500). The first inner elastic part (811) may support the bobbin (500). The first inner elastic part (811) may be driven integrally with the bobbin (500). That is, the first inner elastic part (811) may be moved along with the bobbin (500) just like a portion of the bobbin (500).

The first elastic member (810) may comprise a protrusion. The protrusion of first elastic member (810) may be outwardly extended from the first inner elastic part (811). The protrusion of first elastic member (810) may be extended from the first inner elastic part (811) toward an area where the first outer elastic part (812) is situated. At least a part (outer end) of protrusion of first elastic member (810) may be disposed on at least one of the first groove of housing (200) and a groove of base (900). The protrusion of first elastic member (810) may be adhered by a damping material. As a result, the movement of bobbin (500) caused by oscillation (resonance) phenomenon can be restricted.

The protrusion of first elastic member (810) may comprise a first protrusion (814) and a second protrusion (815). The first protrusion (814) of first elastic member (810) may be disposed opposite to the second protrusion (815), and the vice versa. The first protrusion (814) may be extended from the first inner elastic part (811) toward an area where the first lateral plate (110) of cover (100) is situated. The second protrusion (815) may be extended from the first inner elastic part (811) toward an area where the second lateral plate (120) of cover (100) is located.

At least a part (outer end) of first protrusion (814) at the first elastic member (810) may be disposed (accommodated into) on at least one of the 1-1 groove (211) of housing (200) and the first groove (910) of base (900). At least a part (outer end) of second protrusion (815) at the first elastic member (810) may be disposed (accommodated into) on at least one of the 1-2 groove (221) of housing (200) and the second groove (920) of base (900).

The first protrusion (814) of first elastic member (810) may comprise a 1-1 protrusion (814-1) and a 1-2 protrusion (814-2). The 1-1 protrusion (814-1) and the 1-2 protrusion (814-2) of first elastic member (810) may take a square plate shape. The 1-1 protrusion (814-1) and the 1-2 protrusion (814-2) of first elastic member (810) may be space apart, and may be disposed in parallel.

In a modification, as shown in FIG. 12, the first elastic member (810) may comprise one protrusion (814) and a hole (814-3) passing through the protrusion (814). At this time, the protrusion (814) of first elastic member (810) may be disposed on any one of the groove (211) of housing (200) and a groove (910) of base (900).

Furthermore, the hole (814-3) of the first elastic member (810) can prevent the damper disposed on the protrusion (814) from being overflown. That is, the hole (814-3) formed on the protrusion (814) of first elastic member (810) may provide a fixing power to the damper.

The second protrusion (815) of first elastic member (810) may comprise a 2-1 protrusion (815-1) and a 2-2 protrusion (815-2). The 2-1 protrusion (815-1) and the 2-2 protrusion (815-2) of first elastic member (810) may take a square plate shape. The 2-1 protrusion (815-1) and the 2-2 protrusion (815-2) of first elastic member (810) may be space apart, and may be disposed in parallel.

The first outer elastic part (812) may be disposed beneath the housing (200). The first outer elastic part (812) may be interposed between the housing (200) and the base (900). The first outer elastic part (812) may be interposed between a lower surface of housing (200) and an upper surface of a staircase part (903). The first outer elastic part (812) may be fixed by the housing (200) and the base (900). The first outer elastic part (812) may be coupled with the housing (200) and/or the base (900).

The first outer elastic part (812) may comprise a groove accommodating the protrusion of first elastic member (810). The groove of first elastic member (810) may be outwardly extended from an inner lateral surface of first outer elastic part (812).

The groove of first elastic member (810) may comprise a first groove (816) and a second groove (817). The first groove (816) of first elastic member (810) may be disposed with at least a part (outer end) of first protrusion (814) of first elastic member (810). The second groove (817) of first elastic member (810) may be disposed with at least a part (outer end) of second protrusion (815) of first elastic member (810). The first groove (816) and the second groove (817) of first elastic member (810) are provided to prevent the first inner elastic part (811) and the first outer elastic part (812) from being brought into contact by the protrusion of the first elastic member (810).

The first connection elastic part (813) may elastically connect the first inner elastic part (811) and the first outer elastic part (812). When the bobbin (500) moves, the first connection elastic part (813) may be elastically deformed to guide the movement of bobbin (500).

The second elastic member (820) may be disposed on the housing (200) and the bobbin (500). The second elastic member (820) may be disposed on an upper surface of housing (200) and an upper surface of bobbin (500). The second elastic member (820) may be coupled to an upper surface of housing (200) and an upper surface of bobbin (500). The second elastic member (820) may elastically connect the housing (200) and the bobbin (500) to elastically support the bobbin (500).

The second elastic member (820) may comprise a second inner elastic part (821), a second outer elastic part (822) and a second connection elastic part (823). The second inner elastic part (821) may be disposed on the bobbin (500). The second inner elastic part (821) may be dispose on an upper surface of bobbin (500). The second inner elastic part (821) may be coupled with the bobbin (500). The second inner elastic part (821) may support the bobbin (500). The second inner elastic part (821) may be integrally driven with the bobbin (500). That is, the second inner elastic part (821) may move along with the bobbin (500) just like a portion of the bobbin (500).

The second elastic member (820) may comprise a protrusion. The protrusion of second elastic member (820) may be outwardly extended from the second inner elastic part (821). The protrusion of second elastic member (820) may be extended from the second inner elastic part (821) toward an area where the second outer elastic part (822) is situated. At least a part (outer end) of protrusion of second elastic member (820) may be disposed on the second groove of housing (200). The protrusion of second elastic member (820) may be adhered by a damping material. As a result, the movement of bobbin (500) caused by oscillation (resonance) phenomenon can be restricted.

The protrusion of second elastic member (820) may comprise mutually spaced-apart first protrusion (821-1), a second protrusion (821-2), a third protrusion (821-3) and a fourth protrusion (821-4).

The first protrusion (821-1) of second elastic member (820) may be disposed opposite to the second protrusion (821-2) of second elastic member (820), and vice versa. The third protrusion (821-3) of second elastic member (820) may be disposed opposite to the fourth protrusion (821-4) of second elastic member (820), and vice versa.

The first protrusion (821-1) of second elastic member (820) may be extended from the second inner elastic part (821) toward an area where the first lateral plate (110) of cover (100) is situated. The second protrusion (821-2) of second elastic member (820) may be extended from the second inner elastic part (821) toward an area where the second lateral plate (120) of cover (100) is situated. The third protrusion (821-3) of second elastic member (820) may be extended from the second inner elastic part (821) toward an area where the third lateral plate (130) of cover (100) is situated. The fourth protrusion (821-4) of second elastic member (820) may be extended from the second inner elastic part (821) toward an area where the fourth lateral plate (140) of cover (100) is situated.

At least a part (outer end) of first protrusion (821-1) of second elastic member (820) may be disposed (accommodated into) on the 2-1 groove (212) of housing (200). At least a part (outer end) of second protrusion (821-2) of second elastic member (820) may be disposed (accommodated into) on the 2-2 groove (222) of housing (200). At least a part (outer end) of third protrusion (821-3) of second elastic member (820) may be disposed (accommodated into) on the 2-3 groove (232) of housing (200). At least a part (outer end) of fourth protrusion (821-4) of second elastic member (820) may be disposed (accommodated into) on the 2-4 groove (242) of housing (200).

The second outer elastic part (822) may be disposed on the housing (200). The second outer elastic part (822) may be disposed on an upper surface of housing (200). The second outer elastic part (822) may be coupled with the housing (200).

The second outer elastic part (822) may comprise a groove accommodating the protrusion of second elastic member (820). The groove of the second elastic member (820) may be outwardly extended from an inner surface of the second outer elastic part (822).

The groove of second elastic member (820) may comprise a first groove (822-1), a second groove (822-2), a third groove (822-3) and a fourth groove (822-4). The first groove (822-1) of second elastic member (820) may be disposed with at least a part (outer end) of the first protrusion (821-1) of second elastic member (820). The second groove (822-2) of second elastic member (820) may be disposed with at least a part (outer end) of the second protrusion (821-2) of second elastic member (820). The third groove (822-3) of second elastic member (820) may be disposed with at least a part (outer end) of the third protrusion (821-3) of second elastic member (820). The fourth groove (822-4) of second elastic member (820) may be disposed with at least a part (outer end) of the fourth protrusion (821-4) of second elastic member (820). The first groove (822-1), the second groove (822-2), the third groove (822-3) and the fourth groove (822-4) of second elastic member (820) are provided to prevent the second inner elastic part (821) and the second outer elastic part (822) from being brought into contact by the protrusion of the second elastic member (820).

The second connection elastic part (823) may elastically connect the second inner elastic part (821) and the second outer elastic part (822). The second connection elastic part (823) may guide the movement of bobbin (500) by being elastically deformed when the bobbin (500) is moved.

The base (900) may be disposed underneath the cover (100). The base (900) may support the cover (100). The base (900) and the cover (100) may be coupled by mutually being brought into contact. The base (900) may be disposed underneath the housing (200) and the bobbin (500). In this case, a first elastic member (810) may be interposed between the base (900) and the housing (200) and between the base (900) and the bobbin (500).

The base (900) may comprise a fence (902), a staircase part (903), a jaw part (904), a reception part (905) and a groove. The base (900) may take a cubic shape centrally formed with a hole (901). The hole (901) of base (900) is formed to provide a light path.

The fence (902) may be upwardly protruded from an upper surface of base (900). The fence (902) may be disposed along the hole (901) of base (900). The fence (902) may be intermittently disposed. The fence (902) may be formed to prevent inflow of foreign objects into the hole (901) of base (900).

The staircase part (903) may be upwardly protruded from an edge of an upper surface of base (900). The upper surface of staircase part (903) may be disposed with a groove of base (900). The upper surface of staircase part (903) may be disposed with a first outer elastic part (812) of first elastic member (810).

The jaw part (904) may be outwardly protruded from an outer surface of base (900). The jaw part (904) may support the cover (100). At least a part of the first lateral plate (110), the second lateral plate (120), the third lateral plate (130) and the fourth lateral plate (140) of cover (100) may be disposed on the jaw part (904). In this case, at least a lower surface of the first lateral plate (110), the second lateral plate (120), the third lateral plate (130) and the fourth lateral plate (140) of cover (100) may face an upper surface of the jaw part (904). Between at least a lower surface of the first lateral plate (110), the second lateral plate (120), the third lateral plate (130) and the fourth lateral plate (140) of cover (100) and an upper surface of jaw part (904), there may be disposed with an adhesive. At least a part of the first lateral plate (110), the second lateral plate (120), the third lateral plate (130) and the fourth lateral plate (140) of cover (100) may be brought into contact with an upper surface of jaw part (904).

The reception part (905) of base (900) may be so disposed as to correspond with the sensor (400). The reception part (905) of base (900) may be formed by allowing a surface facing the fourth lateral plate (140) of cover (100) to be inwardly recessed from the base (900). The reception part (905) of base (900) may be disposed with a connection substrate (420) of sensor (400).

The groove of base (900) may be disposed on an upper surface of base (900). The groove of base (900) may be disposed on an upper surface of staircase part (903) of base (900). The groove of base (900) may be downwardly extended from an upper surface of base (900) and may be outwardly extended from an inner surface of base (900). The groove of base (900) may be downwardly extended from an upper surface of staircase part (903) of base (900), and may be outwardly extended from an inner surface of staircase part (903) of base (900). At least a part (outer end of protrusion) of first elastic member (810) may be disposed at the groove or on the groove of base (900). The groove of base (900) may be disposed with a damping material. That is, the groove of base (900) may be filled with a damping material. The groove of base (900) may be disposed underneath the first groove of housing (200). The groove of base (900) and the first groove of housing (200) may be connected to a vertical direction. As a result, the damping material may be sufficiently coated from the groove of base (900) to the first groove of housing (200) to a vertical direction. Because of the coated scope of the damping material, the bobbin (500) may be stably fixed within all scope regardless of vertical direction position. Furthermore, contamination of ambient environment caused by overflow of damping material can be prevented.

The first groove of base (900) may comprise a first groove (910) and a second groove (920). The first groove (910) and the second groove (920) of base (900) may face each other. The first groove (910) of base (900) may be disposed on an opposite side of second groove (920) of base (900), and vice versa.

The first groove (910) of base (900) may be so disposed as to face (correspond with) the first lateral plate (110) of cover (100). The second groove (920) of base (900) may be so disposed as to face (correspond with) the second lateral plate (120) of cover (100).

The first groove (910) of base (900) may be downwardly extended from an upper surface of base (900), and may be outwardly extended from an inner surface of base (900). The first groove (910) of base (900) may be extended from an inner surface of base (900) to a direction where the first lateral plate (110) of cover (100) is situated. The first groove (910) of base (900) may be downwardly extended from an upper surface of staircase part (903) of base (900), and may be outwardly extended from an inner surface of the staircase part (903) of base (900). The first groove (910) of base (900) may be extended from an inner surface of staircase (903) of base (900) to a direction where the first lateral plate (110) of cover (100) is situated.

The second groove (920) of base (900) may be downwardly extended from an upper surface of base (900), and may be outwardly extended from an inner surface of base (900). The second groove (920) of base (900) may be extended from an inner surface of base (900) to a direction where the second lateral plate (120) of cover (100) is situated. The second groove (920) of base (900) may be downwardly extended from an upper surface of staircase part (903) of base (900), and may be outwardly extended from an inner surface of the staircase part (903) of base (900), and may be outwardly extended from an inner surface of staircase part (903) of base. The second groove (920) of base (900) may be extended from an inner surface of staircase (903) of base (900) to a direction where the second lateral plate (120) of cover (100) is situated.

The first groove (910) of base (900) may be disposed (accommodated into) with a first protrusion (814) of first elastic member (810). The first groove (910) of base (900) may be vertically connected with the 1-1 groove (211) of housing (200). The first groove (910) of base (900) may be filled with a damping material to adhere the first protrusion (814) of the first elastic member (810).

The second groove (920) of base (900) may be disposed (accommodated into) with a second protrusion (815) of first elastic member (810). The second groove (920) of base (900) may be vertically connected with the 1-2 groove (221) of housing (200). The second groove (920) of base (900) may be filled with a damping material to adhere the second protrusion (815) of the first elastic member (810).

The bobbin (500) may be bi-directionally fixed by the first groove (910) and the second groove (920) of base (900) to prevent the bobbin (500) from being tilted.

Meantime, the first groove of housing (200) and the groove of base (900) may be formed with a mutually different size (volume) in response to a design request. That is, the 1-1 groove (211) of housing (200) and the first groove (910) of base (900) may be formed with a mutually different size (volume), and the 1-2 groove (221) of housing (200) and the second groove (920) of base (900) may be formed with a mutually different size (volume).

The strength of adhesion of the first elastic member (810) may become to be different in response to an upper side stroke and a lower side stroke of bobbin (500) when the bobbin (500) is driven to a bi-direction (upper side and a lower side). Thus, when the upper side stroke of bobbin (500) is greater than the lower side stroke (when an upper movement of bobbin is greater than a lower side movement of bobbin), the volume (size) of first groove of housing (200) is made to be greater than the volume (size) of groove of base (900) to allow a more amount of damping material to be filled on the upper side of the first elastic member (810). The lower side stroke of bobbin (500) may be greater than the upper side stroke of bobbin (500) (When the lower side movement of bobbin is greater than the upper side movement of bobbin), and the vice versa.

As discussed above, a distance (L1) from the groove of base (900) to a mutually-facing surface and a distance (L2) from the first groove of housing (200) to a mutually facing surface may be different (See FIG. 11). That is, a distance from the first groove (910) of base (900) to a mutually facing surface may be different from a distance from the 1-1 groove (211) of housing (200) to a mutually facing surface, and a distance from the second groove (920) of base (900) to a mutually facing surface and a distance from the 1-2 groove (221) of housing (200) may be different from a distance from the 1-2 groove (221) to a mutually facing surface. In order to allow a part of upper surface of base (900) to be vertically overlapped with the 1-1 groove (211) of housing (200), a width of the first groove (910) at the base (900) may be narrower than a width of the 1-1 groove (211) of housing (200).

Hereinafter, a lens driving device (1000) according to second to fourth exemplary embodiments of the present invention will be described with reference to FIGS. 14 to 25.

Figure 14:
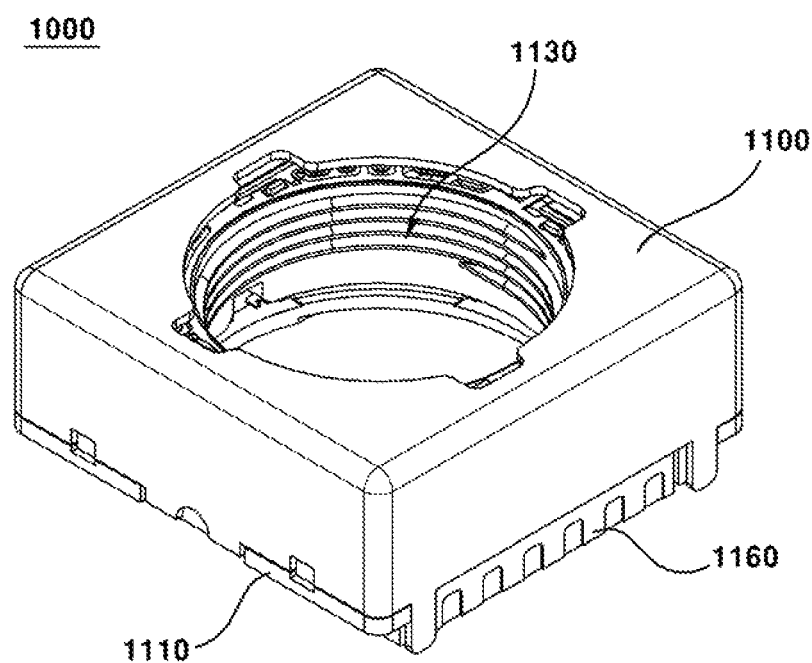
FIG. 14 is a perspective view illustrating a lens driving device according to a second exemplary embodiment of the present invention.
Figure 15:
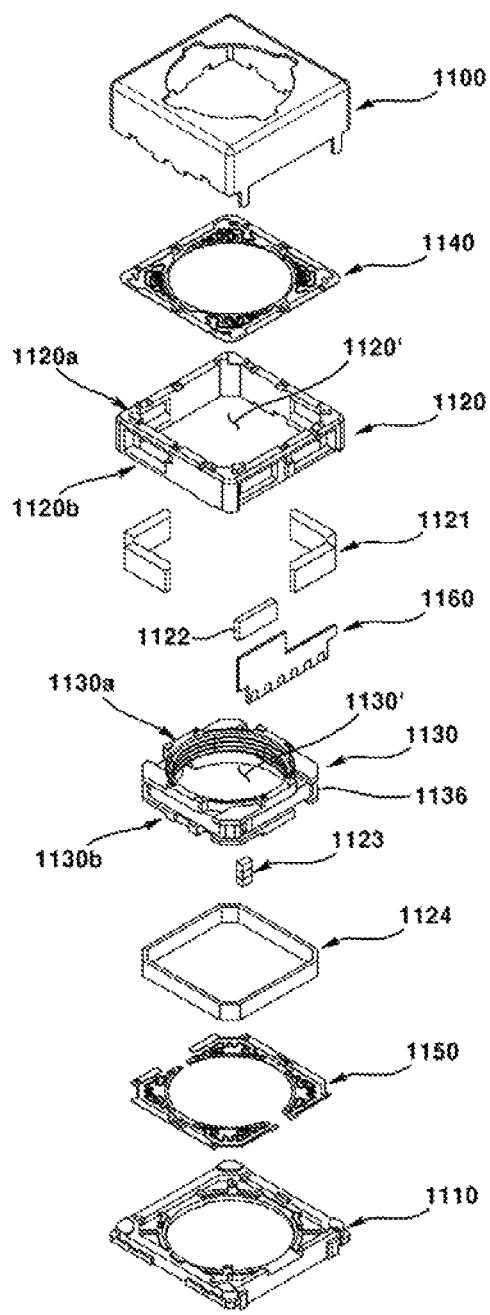
FIG. 15 is an exploded perspective view of various elements of a lens driving device according to a second exemplary embodiment of the present invention.
Figure 16:
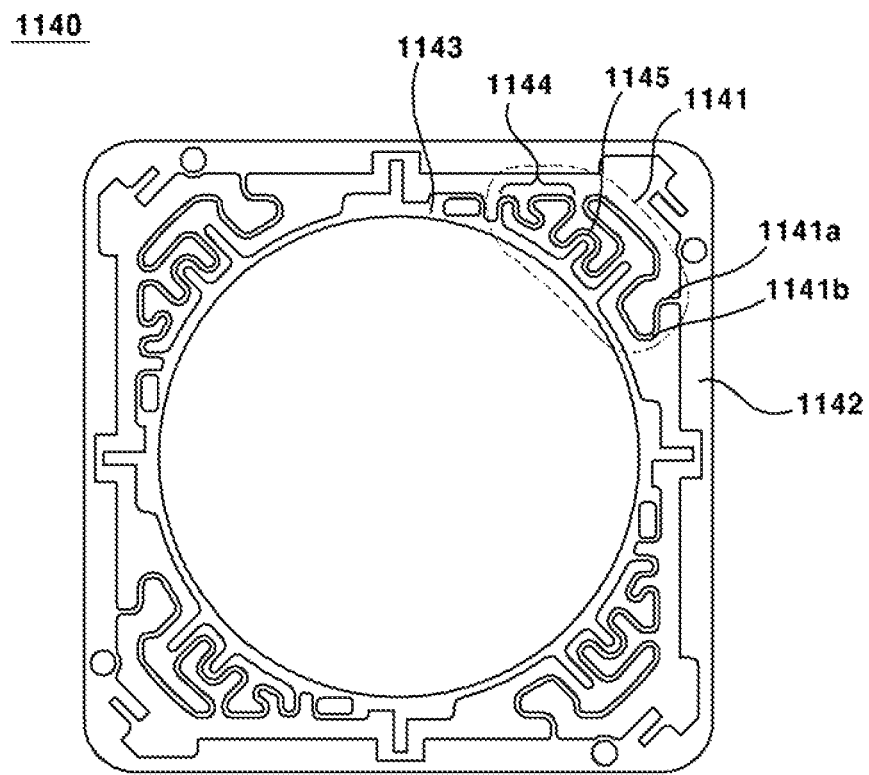
FIGS. 16 and 17 are schematic views respectively illustrating upper and lower elastic members according to a second exemplary embodiment of the present invention.
Figure 17:
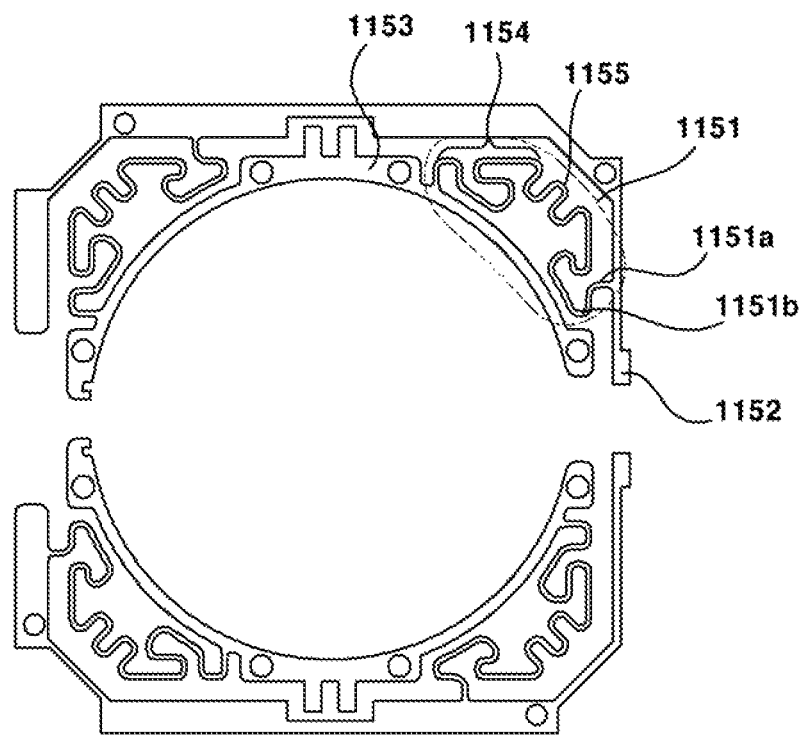
Figure 18:
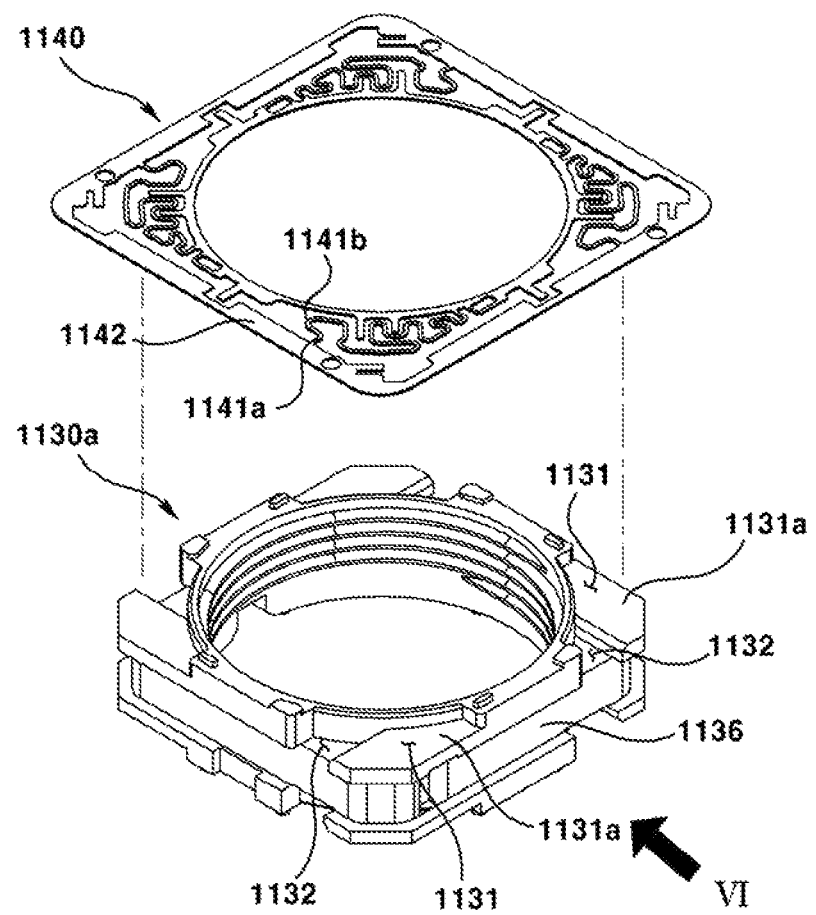
FIGS. 18 and 19 are respectively a perspective view of separated upper surface of bobbin and an upper elastic member of bobbin, and a perspective view of upper elastic member and a substrate being coupled on an upper surface of bobbin according to a second exemplary embodiment of the present invention.
Figure 19:
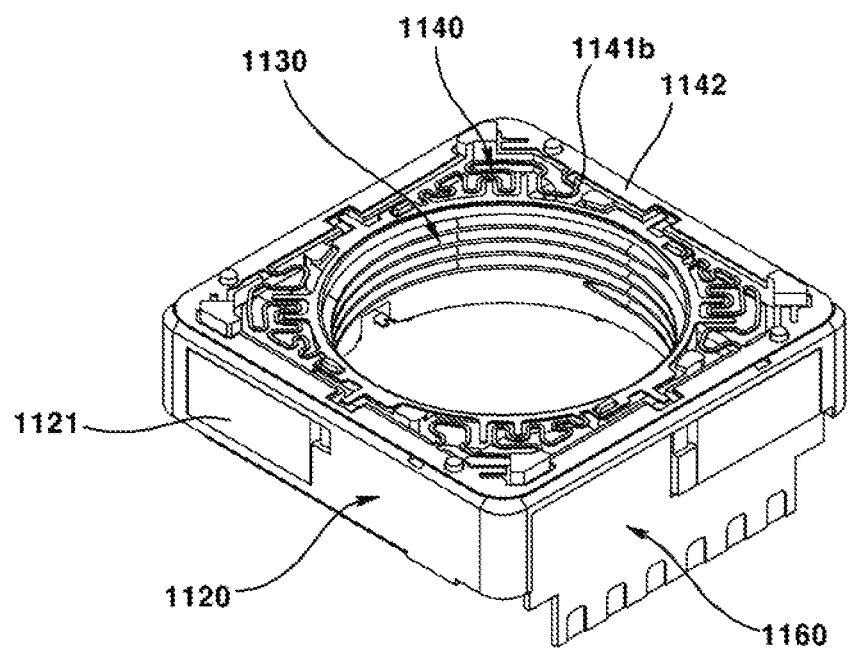
Figure 20:
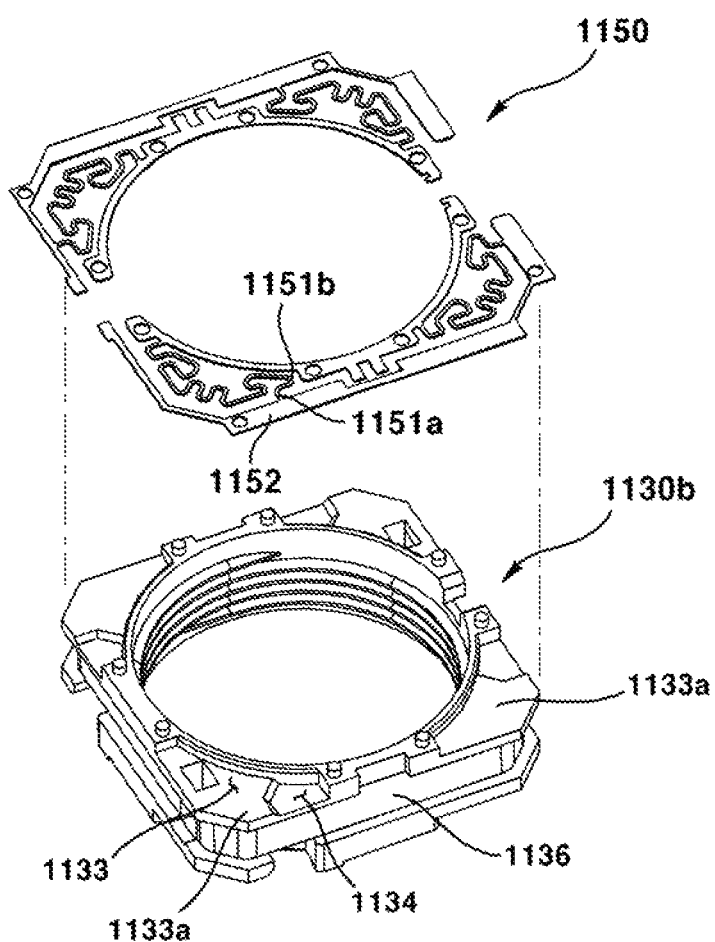
FIGS. 20 and 21 are respectively a perspective view of separated lower surface of bobbin and a lower elastic member, and a perspective view of a lower elastic member and a substrate being coupled on a lower surface of bobbin according to a second exemplary embodiment of the present invention.
Figure 21:
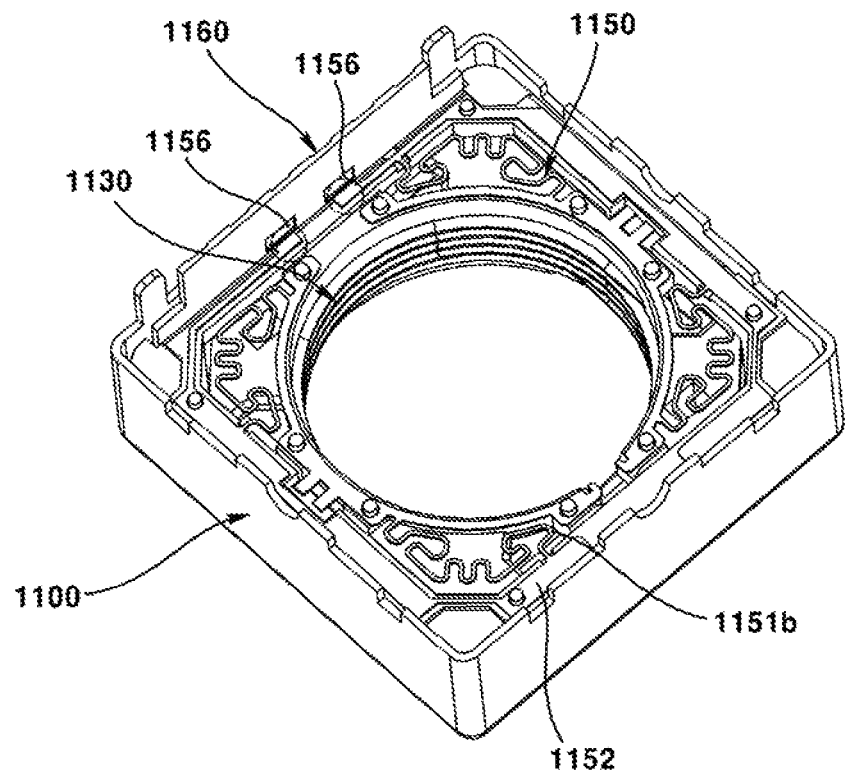
Figure 22:
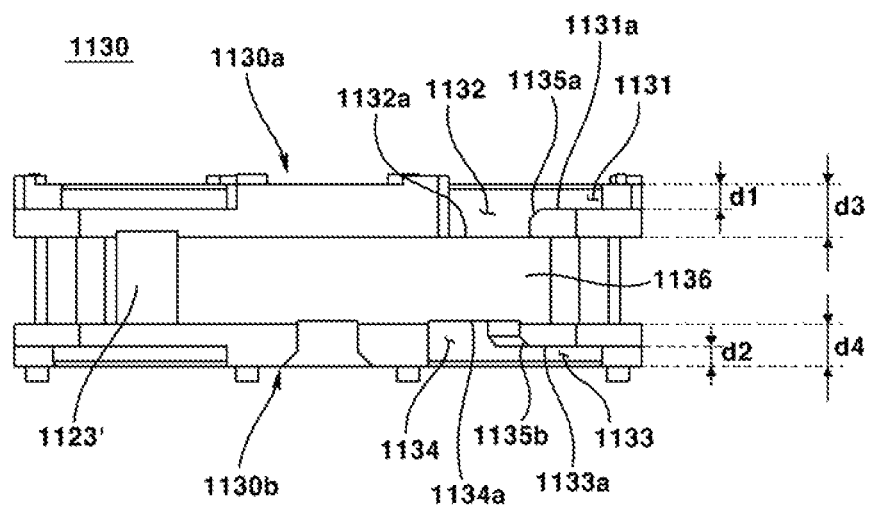
FIG. 22 is a front view of a bobbin taken along line V1 of FIG. 18 according to a second exemplary embodiment of the present invention.

FIG. 14 is a perspective view illustrating a lens driving device according to a second exemplary embodiment of the present invention, FIG. 15 is an exploded perspective view of various elements of a lens driving device according to a second exemplary embodiment of the present invention, FIGS. 16 and 17 are schematic views respectively illustrating upper and lower elastic members according to a second exemplary embodiment of the present invention, FIGS. 18 and 19 are respectively a perspective view of separated upper surface of bobbin and an upper elastic member of bobbin, and a perspective view of upper elastic member and a substrate being coupled on an upper surface of bobbin according to a second exemplary embodiment of the present invention, FIGS. 20 and 21 are respectively a perspective view of separated lower surface of bobbin and a lower elastic member, and a perspective view of a lower elastic member and a substrate being coupled on a lower surface of bobbin according to a second exemplary embodiment of the present invention, and FIG. 22 is a front view of a bobbin taken along line V1 of FIG. 18 according to a second exemplary embodiment of the present invention.

Referring to FIGS. 14 and 15, a lens driving device (1000) according to an exemplary embodiment of the present invention may be a VCM (Voice Coil Motor), and may comprise a cover (1100), a base (1110), a housing (1120), a bobbin (1130), upper and lower elastic members (1140, 1150) and a substrate (1160).

The cover (1100) may take a lower surface-opened cubic shape, and may be coupled at a lower surface by the base (1110). Furthermore, one side of base (1110) may be connected by a substrate (1160).

An upper side of base (1110) may be disposed with the housing (1120) and the bobbin (1130), and the housing (1120) and the bobbin (1130) may be accommodated into the cover (1100). As a result, the cover (1100) may form an outer look of lens driving device (1000).

An outer circumferential surface of bobbin (1130) may be disposed with a coil winding part (1136), and a bobbin hole (1130') may be formed at a center of the bobbin. The coil winding part (1136) may be coupled by an AF driving coil (1124), and the bobbin hole (1130') may be coupled by a lens (not shown). Furthermore, the bobbin (1130) may be coupled by a sensing magnet (1123).

The AF driving coil (1124) may be an integrally formed one coil, and the bobbin (1130) and the lens may be screw-connected and/or coupled by an adhesive.

The housing (1120) may be coupled by a plurality of magnets (1121) and AF feedback sensor (1122), and may be generally coupled by an adhesive. The plurality of magnets (1121) may be generally disposed to face the AF driving coil (1124). Furthermore, the AF feedback sensor (1122) may comprise a Hall sensor (not shown), and may be a position detection sensor.

The bobbin (1130) may be movably coupled from the housing (1120) by upper and lower elastic members (1140, 1150). To be more specific, the bobbin (1130) may be disposed inside a through hole (1120') formed inside of the housing (1120), and the bobbin (1130) and the through hole (1120') may be connected by the upper and lower elastic members (1140, 1150).

An upper surface (1120a) of housing and an upper surface (1130a) of bobbin may be coupled by the upper elastic member (1140), and a lower surface (1120b) of housing and a lower surface (1130b) of bobbin may be coupled by the lower elastic member (1150).

Each of bobbin (1130) and housing (1120) may be coupled to the upper and lower elastic members (1140, 1150) by thermal fusion and/or adhesive.

When a current is supplied to the AF driving coil (1124) to form an electromagnetic field about the AF driving coil (1124), the AF driving coil (1124) and the plurality of magnets (1121) may mutually generate an electromagnetic interaction, and the bobbin (1130) may be moved to an optical axis direction, i.e., to the vertical direction by the upper and lower elastic members (1140, 1150).

When the bobbin (1130) is moved from the housing (1120), the sensing magnet (1123) disposed on the bobbin (1130) may be moved along with the bobbin (1130), and at this time, the AF feedback sensor (1122) disposed on the housing (1130) may detect the movement of bobbin (1130) and the lens by detecting the magnetic force in response to the position of the sensing magnet (1123).

In general, the AF feedback sensor (1122) is electrically connected to a substrate (1160) and a detection value detected by the AF feedback sensor (1122) may be transmitted to a controller of electronic device through the substrate (1160) and may be used for AF feedback control.

Although the above description has exemplified that the AF feedback sensor (1122) is disposed on the housing (1120), and the sensing magnet (1123) is disposed on the bobbin (1130) to explain the driving of bobbin (1130), the AF feedback sensor (1122) may be disposed on the bobbin (1130), and the sensing magnet (1123) may be disposed on the housing (1120), as a modification.

Referring to FIGS. 16 and 17, the upper and lower elastic members (1140, 1150) connecting the bobbin (1130) and the housing (1120) may respectively comprise an outer part (1142, 1152) coupled to the housing (1120), an inner part (1143, 1153) coupled to the bobbin (1130), and a first connection part (1141, 1151) connecting the outer part (1142, 1152) and the inner part (1143, 1153). The inner part (1143, 1153), the outer part (1142, 1152) and the first connection part (1141, 1151) may be integrally formed.

Four each first connection parts (1141, 1151) may be formed on the upper and lower elastic members 1140, 1150), as shown in FIGS. 16 and 17. However, the number of first connection parts (1141, 1151) is not limited thereto, and may be variably changed.

The first connection part (1141, 1151) may have a sufficient length for possible elastic transformation and simultaneously may be formed in a winding crooked shape for being disposed between the inner lateral part (1143, 1153) and the outer lateral part (1142, 1152), whereby a plurality of curvature parts (1145, 1155) may be formed. Furthermore, the curvature part may be a bent part and/or curved part.

Although the upper elastic member (1140) illustrated in FIG. 16 and the lower elastic member (1150) illustrated in FIG. 17 may seem to show a bit different shape, this supposedly different look is to simply show a different shape in terms of structural aspect for easy structural coupling with other elements including the bobbin (1130), the housing (1120), and the base (1110) comprised in the lens driving device (1000), and therefore, the upper elastic member (1140) and the lower elastic member (1150) may be in essence of the same configuration. The lower elastic member may comprise two lower elastic units, and each of the lower elastic units may be respectively connected to two distal ends of AF driving coil. The AF driving coil may be applied with an outside current through the said two lower elastic units.

For detailed explanation of elastic members and for convenience sake, the upper and lower elastic members (1140, 1150) illustrated in FIGS. 16 and 17 are viewed as an example of elastic member comprised in the lens driving device (1000). However, the upper and lower elastic members (1140, 1150) may not be limited to the given example, and may be formed with a mutually same shape, or with a mutually different shape.

The first connection part (1141, 1151) may comprise a first extension part (1141a, 1151a), a second extension part (1141b, 1151b), and a coupling part (1144, 1154), where the first extension part (1141a, 1151a), the second extension part (1141b, 1151b) and the coupling part (1144, 1154) are all integrally connected.

The second extension part (1141b, 1151b), from positions of curvature parts (1145, 1155) illustrated in FIGS. 16 and 17, may be connected at one end to the coupling part (1144, 1154), and the other end of the second extension part (1141b, 1151b) may be connected to the first extension part (1141a, 1151a) while maintaining a predetermined angle. Furthermore, the coupling part (1144, 1154) may be extended to a direction opposite to a direction distancing from the second extension part (1141b, 1151b), i.e., a direction extended by the second extension part (1141b, 1151b), and may be connected to the inner lateral part (1143, 1153).

The first extension part (1141a, 1151a) may be straightly extended toward the inner lateral part (1143, 1153) from the outer part (1142, 1152), and may be so formed as to create a right angle with the outer lateral part (1142, 1152). However, the first extension part (1141a, 1151a) may be so formed as to create various angles with the outer lateral part (1142, 1152), where the said various angles may comprise an acute angle smaller than a right angle or an obtuse angle larger than a right angle.

The second extension part (1141b, 1151b) may be extensively formed from the first extension part (1141a, 1151a), and may be extended to a direction opposite to where the coupling part (1144, 1154) connected to one end of the first extension part (11412a, 1151a) is disposed based on the first extension part (1141a, 1151a).

That is, the second extension part (1141b, 1151b) may be extensively formed from the first extension part (1141a, 1151a) toward a direction opposite to where the first extension part (1141a, 1151a) and the coupling part (1144, 1154) are connected based on the first extension part (1141a, 1151a).

When the bobbin (1130) is moved from the housing (1120), although the first extension part (1141a, 1151a) has no great amount of elastic transformation due to being connected to the outer lateral part (1142, 1152), the second extension part (1141b, 1151b) may be elastically transformed by a rotating moment or an elastic moment generated about the first extension part (1141a, 1151a).

At this time, the second extension part (1141b, 1151b) may collide with the bobbin (1130) and may be damaged by the shock depending on moving distance of bobbin (1130) or tilt of bobbin (1130).

In order to solve the aforesaid problems, as shown in FIGS. 18 to 21, at least any one or more surfaces of an upper surface (1130a) and a lower surface (1130b) of bobbin may be formed with a groove.

When in an initial state before driving of lens drive device, the lens driving device of unidirectional driving method contacting a base (1110) at a lower surface of housing (1120) may be formed with a first groove (1131) on any one surface of the upper surface (1130a) and the lower surface (1130b) of bobbin.

However, when in an initial state before driving of lens driving device, it is preferable that the lens driving device of bidirectional driving method not contacting a base (1110) at a lower surface of bobbin (1130) and the housing (1120) be formed with a first groove (1131, 1133) respectively on the upper surface (1130a) and the lower surface (1130b) of bobbin.

Hereinafter, for convenience of explanation, a bi-directionally-driven lens driving device (1000) will be explained as an example with reference to the bobbin (1130) illustrated in FIGS. 18 to 21.

Referring to FIGS. 18 to 21, the first groove (1131, 1133) may be formed by allowing the upper surface (1130a) and the lower surface (1130b) to be partially recessed (caved in), to a direction parallel with a central axis formed with a bobbin hole (1130'), i.e., a central axis of bobbin (1130) and/or to a direction parallel with an optical axis direction.

These plurality of first grooves (1131, 1133) may be divided to a 'a' groove (1131) formed on an upper surface (1130a) of bobbin and a 'b' groove formed on a lower surface (130b) of bobbin, where the 'a' groove (1131) and the 'b' groove (1133) may be formed in the same number as that of the first connection part (1141, 1151) formed on the upper and lower elastic members (1140, 1150), but may be greater than the number of the first connection part (1141, 1151).

The 'a' groove (1131) and the 'b' groove (1133) may be also formed on a position mutually overlapped on the upper and lower surfaces (1130a, 1130b) of bobbin. In other words, the 'b' groove (1133) may be formed on the lower surface (1130b) of bobbin overlapped with a position formed by the 'a' groove (1131). This is because the positions formed by the first connection part (1141, 1151) on the upper and lower elastic members (1140, 1150) are mutually corresponded. However, in a modification different from the forgoing explanation, the positions of the first connection parts (1141, 1151) formed on the upper and lower elastic members (1140, 1150) are mutually different, such that the 'a' groove (1131) and the 'b' groove (1133) may not be overlapped on an optical axis direction. However, the following explanation will exemplify the positions of first connection parts (1141, 1151) formed on the upper and lower elastic members (1140, 1150) being mutually different or being mutually identical.

The first groove (1131, 1133) may be so formed as to be overlapped with the first connection parts (1141, 1151) of upper and lower elastic members (1130a, 1130b) of bobbin respectively coupled to the upper and lower surfaces (1130a, 1130b) of bobbin. Thus, when the first connection part (1141, 1151) is elastically transformed, no contact is made with the upper and lower surfaces (1130a, 1130b) of bobbin.

Furthermore, the first groove (1131, 1133) may further comprise a second groove (1132, 1134). That is, the second groove (1132, 1134) may be formed by allowing a bottom surface (1131a, 1133b) of first groove to be partially recessed (caved in) to a direction parallel with the central axis of bobbin (1130) and/or to an optical axis direction.

These plurality of second grooves (1132, 1134) may be divided to a 'c' groove (1132) additionally added to the 'a' groove (1131), and a 'd' groove (1134) additionally formed on the 'b' groove (1133), and the 'c' groove (1132) and the 'd' groove (1134) may be formed in the same number as that of the second extension parts (1141b, 1151b) formed on the upper and the lower elastic members (1140, 1150).

The 'c' groove (1132) and the 'd' groove (1134) may be also formed on a position mutually overlapped at the bottom surface 1131a, 1133a) of first groove. That is, the 'd' groove (1134) may be formed on a bottom surface (1133a) of first groove overlapped with the position formed with the 'c' groove (1132). This is because the positions of second extension parts (1141b, 1151b) are mutually corresponded with the positions formed by the upper and lower elastic members (1140, 1150). However, in a modification different from the foregoing explanation, the 'c' groove (1132) and the 'd' groove (1134) may not be overlapped to an optical axis direction because positions of second extension parts (1141b, 1151b) formed on the upper and lower elastic members (1140, 1150) are mutually different. However, the following description will explain, as an example, the positions of second extension parts (1141b, 1151b) formed on the upper and lower elastic members (1140, 1150) being mutually corresponded or being mutually same.

Referring to FIGS. 19 and 21, the housing (1120) may be coupled by magnets (1121), and one side of housing (1120) may be connected by a substrate (1160). Furthermore, the housing (1120) may be connected to the bobbin (1130) by the upper and lower elastic members (1140, 1150). The housing (1120) thus connected with the bobbin (1130) may be inserted into the cover (1100).

At this time, as shown in FIGS. 19 and 21, the first connection part (1141, 1151) of upper and lower elastic members (1140, 1150) may be positioned at an upper side of the first groove (1131, 1133), and when the first connection parts (1141, 1151) are elastically transformed, the first connection parts (1141, 1151) may not be brought into contact with the bobbin (1130) by the first groove (1131, 1133).

Moreover, the second extension parts (1141b, 1151b) of upper and lower elastic members (1140, 1150) may be positioned at an upper side of second groove (1132, 1134), and when the second extension parts (1141b, 1151b) are elastically transformed, the second extension parts (1141b, 1151b) may not be brought into contact with the bobbin (1130) by the second groove (1132, 1134).

Thus, when the first extension parts (1141, 1151) and the second extension parts (1141b, 1151b) are elastically transformed, the first extension parts (1141, 1151) and the second extension parts (1141b, 1151b) may not collide with the bobbin (1130) by the first groove (1131, 1133) and the second groove (1132, 1134).

Furthermore, as shown in FIG. 21, the lower elastic member (1150) may be electrically connected to the substrate (1160). At this time, the lower elastic member (1150) may be fixed to the substrate (1160) by fusion or soldering method. At this time, as illustrated in FIG. 21, the lower elastic member (1150) may be fused or soldered to the substrate (1160) on at least one or more joint parts (1156). Moreover, the joining method between the lower elastic member (1150) and the substrate (1160) may be identically applied to that of the upper elastic member (1140).

Furthermore, albeit not shown in FIGS. 19 and 21, the upper elastic member (1140) may be also electrically connected to the substrate (1160). In this case, the substrate (1160) may be connected to the housing (1120) to allow being contacted at one lateral surface of housing (1120) to the upper elastic member (1140).

For example, the substrate (160) illustrated in FIG. 19 may be also connected to the housing (1120) to allow a part or one side of substrate (1160) to be exposed to an upper surface direction of housing (1120) connected by the upper elastic member (1140). At this time, the upper elastic member (1140) may be fixed to the substrate (1160) by way of fusion of soldering method, and may be electrically connected to the substrate (1160).

Meantime, referring to FIG. 22, the coil winding part (1136) of bobbin (1130) may be additionally formed with a sensing magnet coupling groove (1123') coupled by the sensing magnet (1123). However, the sensing magnet coupling groove (1123') may be formed on other position than that of the coil winding part (1136).

Meanwhile, a surface connecting the first groove (1131, 1133) and the second groove (1132, 1134) may respectively comprise an inclination (1135a, 1135b). Despite the elastic transformation of the second extension part (1141b, 1151b) by the inclination (1135a, 1135b), there may be no collision with the bobbin (1130).

Furthermore, a distance (d1) from a bottom surface (1131a) of the 'a' groove to an upper surface (1130a) of bobbin and a distance (d2) from a bottom surface (1133a) of the 'b' groove to a lower surface (1130b) of bobbin may be formed to be same.

However, the relationship between the distance values d1 and d2 is not limited thereto, and a distance (d2) from a bottom surface (1133a) of the 'b' groove to a lower surface (1130b) of bobbin may be formed to be shorter than a distance (d1) from a bottom surface (1131a) of the 'a' groove to an upper surface (1130a) of bobbin. This is configured in consideration of the fact that a maximum upwardly moving distance of bobbin is greater than a maximum downwardly moving distance of bobbin. As an example for this configuration, d1 may be minimum 2.5 μm, and d2 may be minimum 2.0 μm. Furthermore, the distance values d1 and d2 may be further narrower in response to miniaturization of lens driving device (1000). Moreover, when a maximum downwardly moving distance of bobbin is greater than a maximum upwardly moving distance of bobbin, the distance value d1 may be further smaller than d2.

In addition, a distance (d3) between a floor surface (1132a) of 'c' groove and an upper surface (1130a) of bobbin may be same as a distance (d4) between a floor surface (1134a) of 'd' groove (1134) and a lower surface (1130b) of bobbin.

However, the relationship between the distance value d3 and d4 is not limited thereto, and a distance (d3) from a floor surface (1132a) of 'c' groove to an upper surface (1130a) of bobbin may be formed to be different from a distance (d4) from a floor surface (1134a) of 'd' groove (1134) to a lower surface (1130b) of bobbin.

In light of the fact that the bobbin (1130) thus described according to a second exemplary embodiment comprises the first groove (1131, 1133) and the second groove (1132, 1134), there is no collision between the upper/lower elastic members (1140, 1150) and the bobbin (1130) when the bobbin (1130) is driven.

Therefore, the lens driving device (1000) according to a second exemplary embodiment can further lengthen the use life of upper and lower elastic members (1140, 1150), and there is no generation of foreign objects that may be generated by collision between the upper and lower elastic members (1140, 1150) and the bobbin (1130).

Moreover, in the bobbin (1130) according to a second exemplary embodiment, and when the second groove (1132, 1134) is formed to have a sufficient depth to an upper surface (1130a) direction of bobbin or to a lower surface (1130b) direction of bobbin on the first groove (1131, 1133), and when the second groove (1132, 1134) is viewed from an upper surface (1130a) or a lower surface (1130b) of bobbin, a part of the AF driving coil (1124) wound on the coil winding part (1136) may be seen.

Hereinafter, a bobbin (1230) according to a third exemplary embodiment will be described with reference to FIG. 23. However, the same configuration of bobbin (1130) as that of the second exemplary embodiment may be briefly described or omitted. Furthermore, same elements as in the second exemplary embodiment may be used with same reference numerals, and any redundant configurations will be omitted in illustration thereof.

Figure 23:
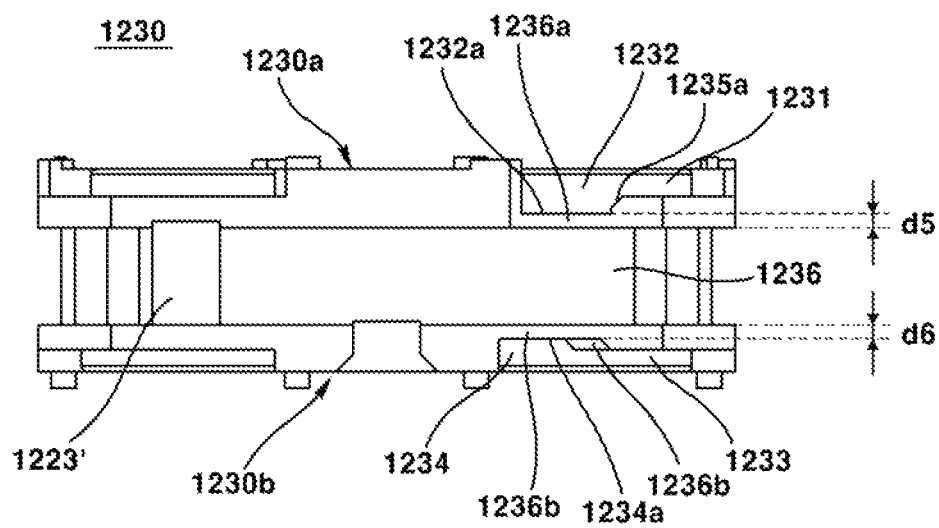
FIG. 23 is a front view of a bobbin according to a third exemplary embodiment of the present invention.

FIG. 23 is a front view of bobbin (1230) according to a third exemplary embodiment of the present invention.

The bobbin (1230) may comprise a first groove (1231, 1233) and a second groove (1232, 1234). Furthermore, the coil winding part (1236) of bobbin (1230) may be additionally formed with a sensing magnet coupling groove (1223') coupled by the sensing magnet (1123). However, the sensing magnet coupling groove (1223') may be formed at a different position other than that of the coil winding part (1236). Furthermore, a surface connecting the first groove (1231, 1233) and the second groove (1232, 1234) may respectively comprise an inclination (1235a, 1235b).

The first groove (1231, 1233) may be divided to a 'a' groove (1231) formed on an upper surface (1230a) of bobbin and a 'b' groove (1233) formed at a lower surface (1230b) of bobbin, and where the second groove (1232, 1234) may be divided to a 'c' groove (1232) additionally formed on the 'a' groove (1231), and a 'd' groove (1234) additionally formed on the 'b' groove (1233).

Each of the 'c' groove (1232) and the 'd' groove (1234) formed on the bobbin (1230) according to the exemplary embodiment may respectively further comprise a cover part (1236a, 1236b).

The cover part (1236a, 1236b) may be configured to cover an upper surface and a lower surface of coil winding part (1236), and may be configured to have a thickness (d5) from an upper surface of coil winding part (1236) to a floor surface (1232a) of 'c' groove, and may be configured to have a thickness (d6) from a lower surface of coil winding part (1236) to a floor surface (1234a) of 'd' groove.

At this time, the thickness of d5 and d6 may have a same value or may have a mutually different value. The cover part (1236a, 1236b) may be integrally formed with the floor surface (1232a) of 'c' groove and a floor surface (1234a) of 'd' groove, and may be possible to be viewed as a part of the floor surface (1232a, 1234a) of 'c' groove and 'd' groove.

The cover part (1236a, 1236b) may prevent the coil (1124) wound on the coil winding part (1236) and the second extension part (1141b, 1151b) from being contacted when the second extension part (1141b, 1151b) is elastically transformed, and may mutually insulate the coil (1124) from the upper and lower elastic members (1140, 1150).

Hereinafter, a bobbin (1330) according to a fourth exemplary embodiment will be described with reference to FIG. 24. However, the same configuration of bobbin (1130) as that of the second exemplary embodiment may be briefly described or omitted. Furthermore, same elements as in the second exemplary embodiment may be used with same reference numerals, and any redundant configurations will be omitted in illustration thereof.

Figure 24:
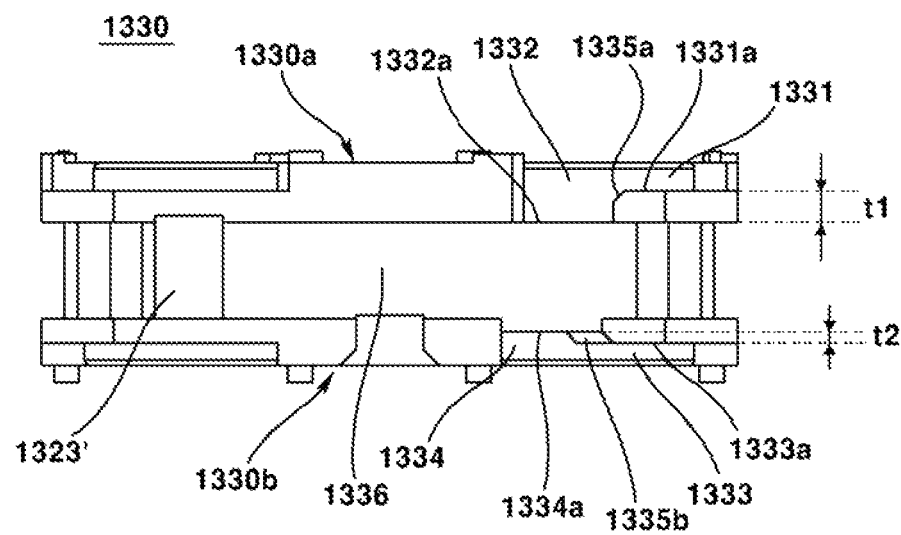
FIG. 24 is a front view of a bobbin according to a fourth exemplary embodiment of the present invention.

FIG. 24 is a front view of bobbin (1330) according to a fourth exemplary embodiment of the present invention.

The bobbin (1330) may comprise a first groove (1331, 1333) and a second groove (1332, 1334). Furthermore, a coil winding part (1336) of bobbin (1330) may be additionally formed with a sensing magnet coupling groove (1323') coupled by a sensing magnet (1123). However, the sensing magnet coupling groove (1323') may be formed at a different position other than that of the coil winding part (1336).

Furthermore, a surface connecting the first groove (1331, 1333) and the second groove (1332, 1334) may respectively comprise an inclination (1335a, 1335b).

The first groove (1331, 1333) may be divided to a 'a' groove (1331) formed on an upper surface (1330a) of bobbin and a 'b' groove (1333) formed at a lower surface (1330b) of bobbin, where the second groove (1332, 1334) may be divided to a 'c' groove (1332) additionally formed on the 'a' groove (1331), and a 'd' groove (1334) additionally formed on the 'b' groove (1333).

A height difference as much as t1 may be formed between a bottom surface (1331a) of 'a' groove and a bottom surface (1332a) of 'c' groove, and a height difference as much as t2 may be formed between a bottom surface (1333a) of 'b' groove and a bottom surface (1334a) of 'd' groove.

When a height difference between bottom surfaces (1131a, 1132a) of 'a' groove and 'c' groove in the bobbin (1130) according to the present exemplary embodiment is defined as t'1, and a height difference between bottom surfaces (1133a, 1134a) of 'b' groove and 'd' groove in the bobbin (1130) is defined as t'2, a relationship of t1<t'1 and t2<t'2 may be formed. Through this relationship, the bobbin (1330) can be miniaturized and overall size and volume of lens driving device can be reduced.

Furthermore, the height value of t1 and t2 may be mutually same in the present exemplary embodiment. However, when the height values of t1 and t2 are differently formed, and when the height values of t1 and t2 are differently formed, it is preferable that the relationship be t2<t1. This is because, in a general lens driving device driven to a bi-direction, the upper elastic member (1140) is relatively transformed to a greater degree than the lower elastic member (1150). This is created in consideration of the fact that a maximum upwardly moving distance of bobbin is greater than a maximum downwardly moving distance of bobbin.

Hereinafter, a bobbin (1430) according to a modification of second exemplary embodiment will be described with reference to FIG. 25.

The bobbin (1430) according to a modification of second exemplary embodiment is only a transformation of shape of second groove in the bobbin (1130) according to the second exemplary embodiment, and the same configuration of bobbin (1130) as that of the second exemplary embodiment may be briefly described or omitted. Furthermore, same elements as in the second exemplary embodiment may be used with same reference numerals, and any redundant configurations will be omitted in illustration thereof.

Figure 25:
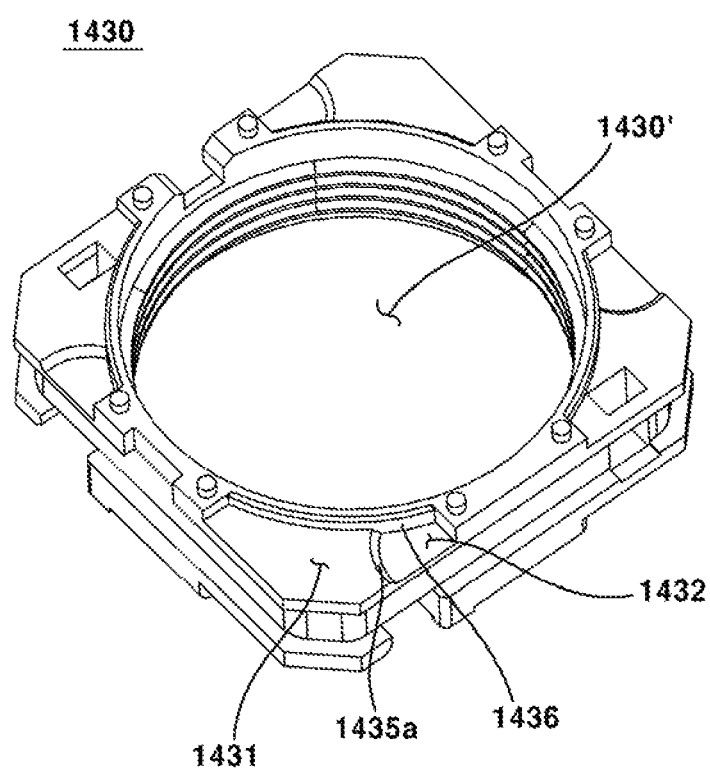
FIG. 25 is a perspective view of a bobbin deformed in a shape of a second groove as a modification of the second exemplary embodiment of the present invention.

FIG. 25 is a perspective view of a bobbin transformed in shape of second groove as a modification to the second exemplary embodiment.

The bobbin (1430) may comprise a first groove (1431) and a second groove (1432). Furthermore, a surface connecting the first groove (1431) and the second groove (1432) may respectively comprise an inclination (1435*a*).

At this time, as shown in FIG. 25, the inclination may be formed with a curved surface. Furthermore, one lateral surface (1436) of second groove formed near to a border between the second groove (1432) and a bobbin hole (1430') may be also formed with a curved surface. This is to prevent the second extension part (1141*b*) having various shapes from colliding with the bobbin (1430) by the second groove (1432) having a lateral surface formed with a curved surface, in light of the fact that the second extension part (1141*b*) is formed with various shapes.

Thus, the bobbin (1430) according to a fourth exemplary embodiment may be such that at least one or more lateral surfaces (1435*a*, 1436) of lateral surfaces forming the second groove (1432) may be formed with a curved surface.

However, although the present exemplary embodiment has explained an example where two lateral surfaces (1435*a*, 1436) forming the second groove (1432) is formed with a curved surface, there is no absolute need of forming the two lateral surfaces (1435*a*, 1436) with curved surfaces, and any other surface than the curved surface may be formed for the said two lateral surfaces (1435*a*, 1436) as long as the second groove (1432) has a shape preventing the second extension part (1141*b*) from colliding with the (1430).

Now, hereinafter, a camera module according to a second exemplary embodiment will be described. However, in light of the fact that a camera module according to the second exemplary embodiment comprises a lens driving device (1000) according to the second exemplary embodiment, explanation of mutually identical elements may be briefly provided or omitted. Furthermore, same elements may be used with same reference numerals, and any redundant configurations may be omitted in illustration thereof.

The camera module according to a second exemplary embodiment may comprise a lens driving device (1000) according to a second exemplary embodiment, a PCB (not shown), and an image sensor (not shown) disposed on the PCB.

In this case, a cover (1100), a base (1110), a housing (1120) and a bobbin (1130) may be disposed on the PCB, and the bobbin hole (1130') of bobbin may be coupled with a lens module.

The said lens module may be overlapped with an image sensor to an optical axis direction, and a light incident from a subject may be refracted by the image sensor.

As noted from the foregoing, because the camera module according to a second exemplary embodiment comprises a first groove (1131, 1133) and a bobbin (1130) formed with a second groove (1132, 1134), no collision between the upper and lower elastic members (1140, 1150) and the bobbin (1130) is generated when the bobbin (1130) is driven or receives a shock.

Therefore, the camera module according to a second exemplary embodiment may be further lengthened in use life of upper and lower elastic members (1140, 1150) and no foreign objects may not be generated by collision between the upper and lower elastic members (1140, 1150) and the bobbin (1130).

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention. Furthermore, terms such as "comprises", "including", "have", "having", "comprises" and/or "comprising" as used herein mean that the relevant elements are embedded, unless otherwise described, such that the mentioned elements are not excluded but may be further comprised.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being comprised in the scope of right of the present invention.

The invention claimed is:

1. A lens driving device, comprising:
a base;
a housing disposed on the base;
a bobbin disposed in the housing;
a coil disposed on the bobbin;
a magnet disposed on the housing and facing the coil;
an upper elastic member coupled to the bobbin and the housing;
a lower elastic member coupled to the bobbin and the housing; and
a first damper connecting the upper elastic member and the housing,
wherein the upper elastic member comprises an outer part coupled to the housing and a moving part extending from the outer part,
wherein the moving part of the upper elastic member is configured to move when the bobbin moves, and
wherein the first damper connects the moving part of the upper elastic member and the housing.

2. The lens driving device of claim 1, wherein the outer part is disposed on an upper surface of the housing,
wherein the housing comprises a damper accommodation part formed on the upper surface of the housing, and
wherein at least a portion of the first damper is disposed on the damper accommodation part of the housing.

3. The lens driving device of claim 2, wherein the moving part of the upper elastic member comprises a protrusion, and
wherein at least a portion of the protrusion is disposed on the damper accommodation part and contacted with the first damper.

4. The lens driving device of claim 3, wherein the outer part of the upper elastic member comprises a groove disposed at a position corresponding to the damper accommodation part of the housing, and
wherein at least a portion of the protrusion of the upper elastic member is disposed at a position corresponding to the groove of the outer part.

5. The lens driving device of claim 3, wherein the moving part of the upper elastic member comprises an inner part coupled to the bobbin and a connection elastic part connecting the inner part and the outer part.

6. The lens driving device of claim 5, wherein the first damper connects the inner part and the housing.

7. The lens driving device of claim 5, wherein the protrusion extends from the inner part toward the outer part.

8. The lens driving device of claim 2, wherein the damper accommodation part comprises a first groove concavely formed on the upper surface of the housing.

9. The lens driving device of claim 1, wherein the upper elastic member is disposed perpendicular to an optical axis.

10. The lens driving device of claim 1, comprising a second damper connecting the lower elastic member and the housing,
wherein the lower elastic member comprises an inner part coupled to the bobbin, an outer part disposed outside the inner part, and a connection elastic part connecting the inner part and the outer part, and
wherein the second damper connects the inner part of the lower elastic member and the housing.

11. The lens driving device of claim 10, wherein the housing comprises a second groove formed on a lower surface of the housing, and
wherein at least a part of the second damper is disposed in the second groove of the housing.

12. The lens driving device of claim 11, wherein a part of the inner part of the lower elastic member is disposed in the second groove of the housing so that the part of the inner part of the lower elastic member is disposed between the housing and the base in an optical axis direction.

13. The lens driving device of claim 11, wherein the inner part of the lower elastic member comprises a protrusion protruding toward the outer part of the lower elastic member, and wherein at least a part of the protrusion of the lower elastic member is disposed in the second groove of the housing.

14. The lens driving device of claim 13, wherein the at least a part of the protrusion of the lower elastic member is overlapped with the housing and the base in an optical axis direction.

15. The lens driving device of claim 13, wherein the base comprises a groove formed on an upper surface of the base, and
wherein at least a part of the second damper is disposed in the groove of the base.

16. The lens driving device of claim 15, wherein a part of the lower elastic member is disposed in the groove of the base or above the groove of the base.

17. The lens driving device of claim 15, wherein the groove of the base and the second groove of the housing are connected in an optical axis direction, and
wherein a width of the groove of the base is narrower than a width of the second groove of the housing so that a part of the upper surface of the base is overlapped with the second groove of the housing in an optical axis direction.

18. A camera module comprising:
a printed circuit board;
an image sensor disposed on the printed circuit board;
the lens driving device of claim 10 disposed above the printed circuit board; and
a lens coupled to the bobbin of the lens driving device.

19. A mobile phone comprising the camera module of claim 18.

20. A lens driving device, comprising:
a housing;
a bobbin disposed in the housing;
a coil disposed on the bobbin;
a magnet disposed on the housing and facing the coil;
an upper elastic member coupled to an upper portion of the bobbin and an upper portion of the housing; and
a damper connecting the upper elastic member and the housing,
wherein the upper elastic member comprises an outer part disposed on the housing and comprising a groove inwardly opened,
wherein the upper elastic member comprises a protrusion,
wherein at least a portion of the protrusion is disposed at a position corresponding to the groove of the outer part, and
wherein the damper connects the protrusion of the upper elastic member and the housing.

21. A lens driving device, comprising:
a housing;
a bobbin disposed in the housing;
a coil disposed on the bobbin;
a magnet disposed on the housing and facing the coil;
an upper elastic member coupled to an upper surface of the bobbing and an upper surface of the housing; and
a damper connecting the upper elastic member and the housing,
wherein the upper elastic member is disposed perpendicular to an optical axis,
wherein the upper elastic member comprises an outer part disposed on the upper surface of the housing, an inner part coupled to the bobbin and a connection elastic part connecting the inner part and the outer part,
wherein the housing comprises a damper accommodation part formed on the upper surface of the housing and configured to accommodate at least a portion of the damper, and
wherein the damper connects the upper elastic member and the damper accommodation part of the housing.

* * * * *